(12) United States Patent
Guering et al.

(10) Patent No.: US 10,358,218 B2
(45) Date of Patent: Jul. 23, 2019

(54) TOOLING ASSEMBLY FOR INTEGRATING A CENTRAL PART OF AN AIRCRAFT, ASSOCIATED METHOD AND AIRCRAFT THUS INTEGRATED

(71) Applicant: Airbus Operations (SAS), Toulouse (FR)

(72) Inventors: Bernard Guering, Montrabe (FR); Laurent Saint-Marc, Montaigut sur Save (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 335 days.

(21) Appl. No.: 15/133,766

(22) Filed: Apr. 20, 2016

(65) Prior Publication Data
US 2016/0304218 A1    Oct. 20, 2016

(30) Foreign Application Priority Data

Apr. 20, 2015  (FR) ..................................... 15 53502

(51) Int. Cl.
| | |
|---|---|
| B64D 11/00 | (2006.01) |
| B64C 1/18 | (2006.01) |
| B64C 1/06 | (2006.01) |
| B64F 5/10 | (2017.01) |
| B64D 11/06 | (2006.01) |

(52) U.S. Cl.
CPC ............ B64D 11/003 (2013.01); B64C 1/068 (2013.01); B64C 1/18 (2013.01); B64F 5/10 (2017.01); *B64D 11/06* (2013.01)

(58) Field of Classification Search
CPC . B64F 5/0009; B64F 5/10; B64C 1/18; B64C 1/068; B64D 11/003; B64D 11/00
See application file for complete search history.

(56) References Cited

U.S. PATENT DOCUMENTS

| | | | | |
|---|---|---|---|---|
| 5,896,637 | A | * 4/1999 | Sarh ....................... | B23P 19/04 227/51 |
| 2001/0054228 | A1 | * 12/2001 | Lehmker .................. | B21J 15/10 29/701 |

(Continued)

FOREIGN PATENT DOCUMENTS

| | | |
|---|---|---|
| DE | 1781118 | 12/1970 |
| DE | 102009034416 | 1/2011 |

(Continued)

OTHER PUBLICATIONS

French Search Report, dated Feb. 11, 2016, priority document.

*Primary Examiner* — Valentina Xavier
(74) *Attorney, Agent, or Firm* — Greer, Burns & Crain, Ltd.

(57) ABSTRACT

A tooling assembly for integrating a central part of the fuselage of an aircraft. The tooling assembly comprises a tooling train which comprises a succession of movable carriages arranged behind one another and which are able to carry one or more items of aircraft equipment to be integrated into the central part of the aircraft. Such a tooling train, which extends over at least a length of the central part of the fuselage, makes it possible to integrate, at the same time, items of aircraft equipment produced in the form of elongate modules, thus reducing the time for integrating the items of aircraft equipment.

27 Claims, 22 Drawing Sheets

(56) References Cited

U.S. PATENT DOCUMENTS

| | | | |
|---|---|---|---|
| 2011/0010007 A1* | 1/2011 | Sarh | B25J 5/007 |
| | | | 700/248 |
| 2011/0266392 A1* | 11/2011 | Goehlich | B64D 11/0015 |
| | | | 244/118.6 |
| 2012/0145828 A1* | 6/2012 | Grosse-Plankermann | ............ |
| | | | B64D 11/00 |
| | | | 244/118.5 |
| 2012/0187248 A1* | 7/2012 | Goehlich | B64C 1/20 |
| | | | 244/137.1 |
| 2012/0330448 A1* | 12/2012 | Reid | G05B 19/41805 |
| | | | 700/96 |
| 2013/0152397 A1* | 6/2013 | Oberoi | B64F 5/0009 |
| | | | 29/897.2 |
| 2013/0185925 A1* | 7/2013 | Sarh | B21J 15/142 |
| | | | 29/559 |
| 2014/0332640 A1 | 11/2014 | Breuer et al. | |
| 2015/0314888 A1* | 11/2015 | Reid | B64F 5/0009 |
| | | | 700/117 |
| 2018/0009520 A1* | 1/2018 | Metten | B64C 1/06 |
| 2018/0016010 A1* | 1/2018 | Benthien | B64D 11/00 |
| 2018/0056511 A1* | 3/2018 | Ayyagari | B25J 5/005 |

FOREIGN PATENT DOCUMENTS

| | | |
|---|---|---|
| DE | 102012001797 | 8/2013 |
| FR | 2548948 | 1/1985 |
| FR | 2713534 | 6/1995 |

\* cited by examiner

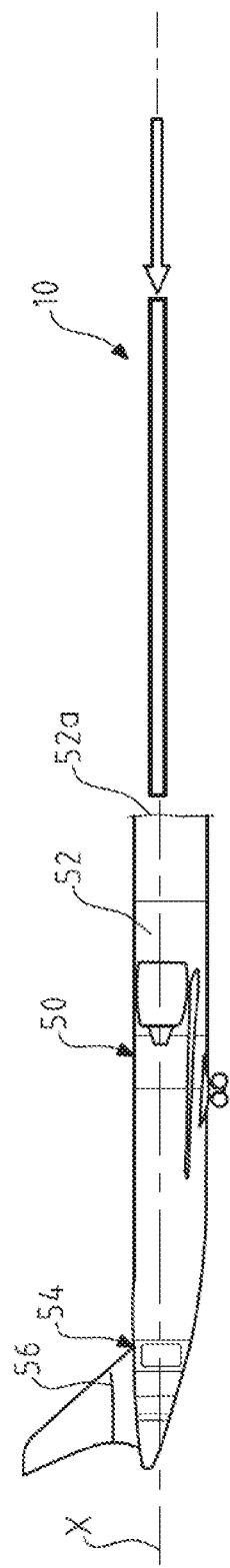
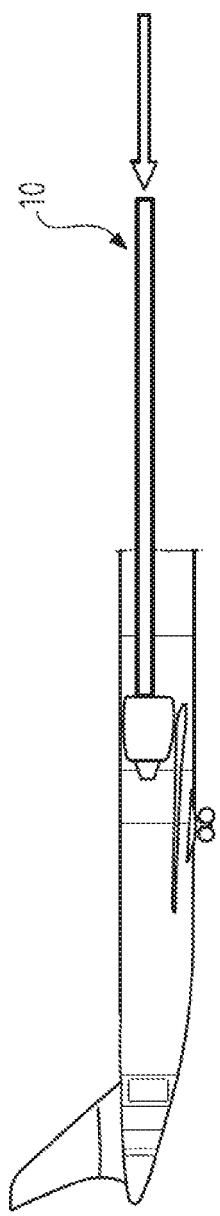
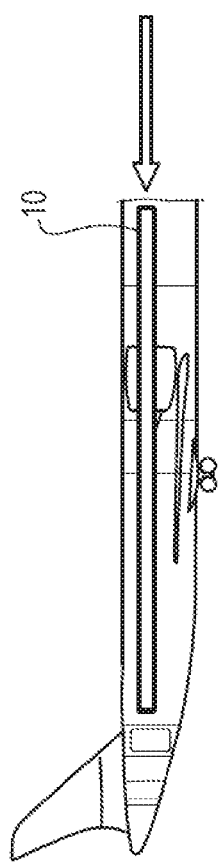

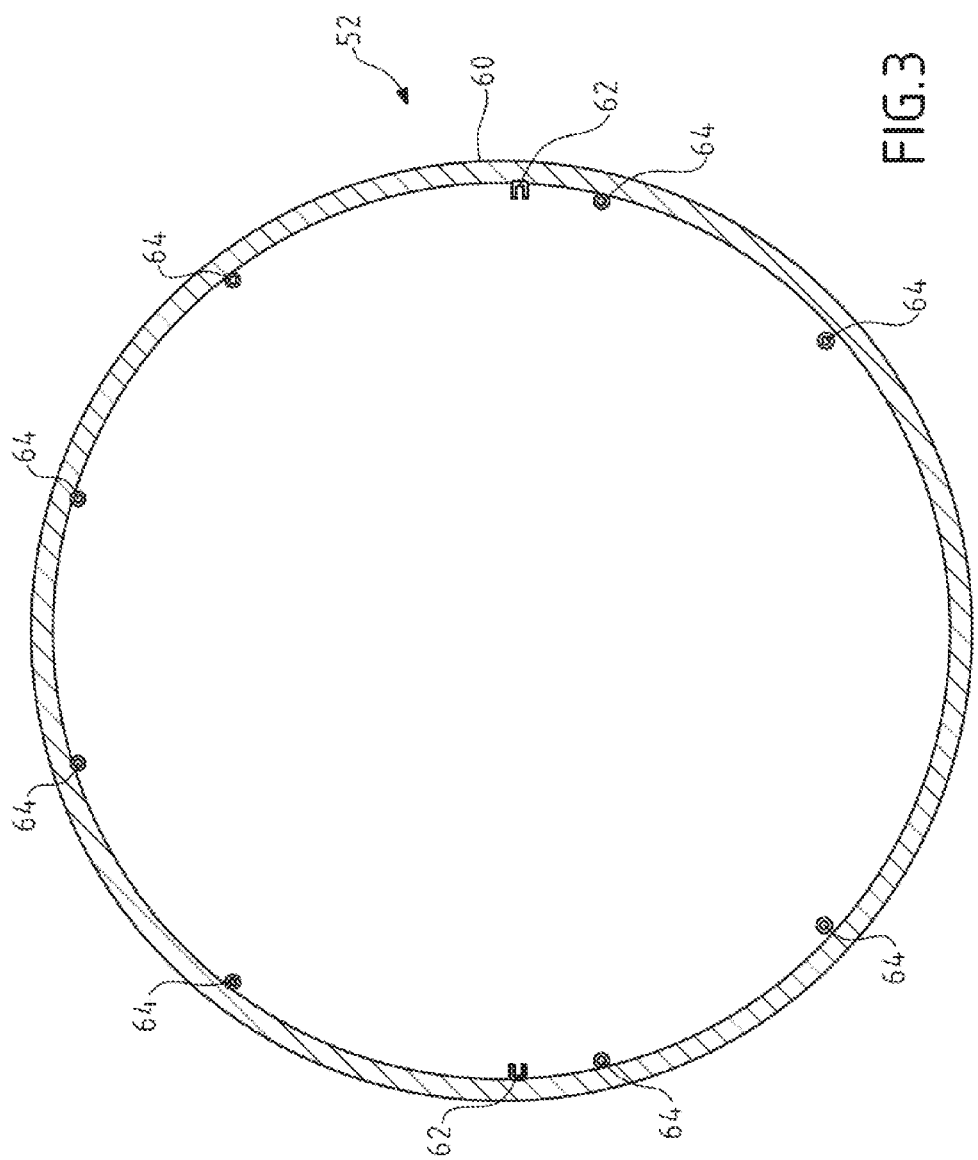

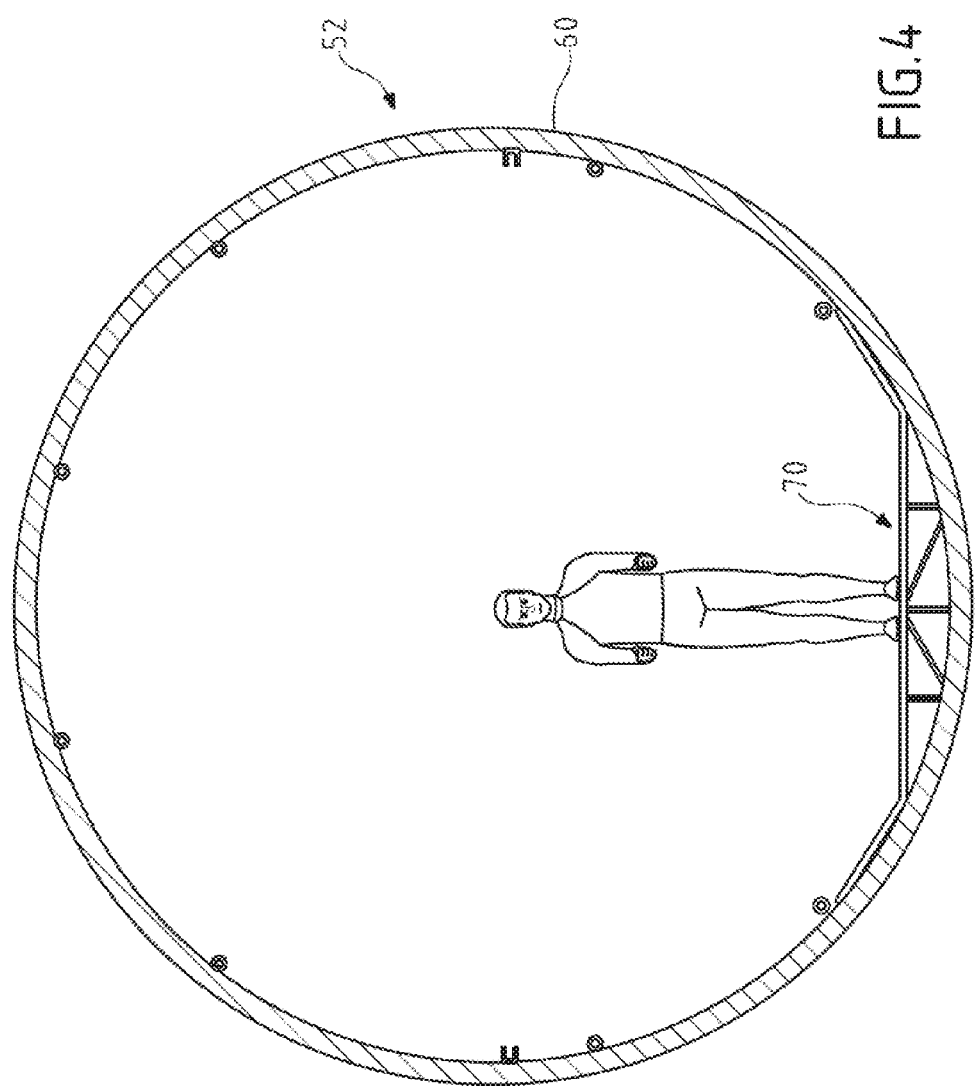

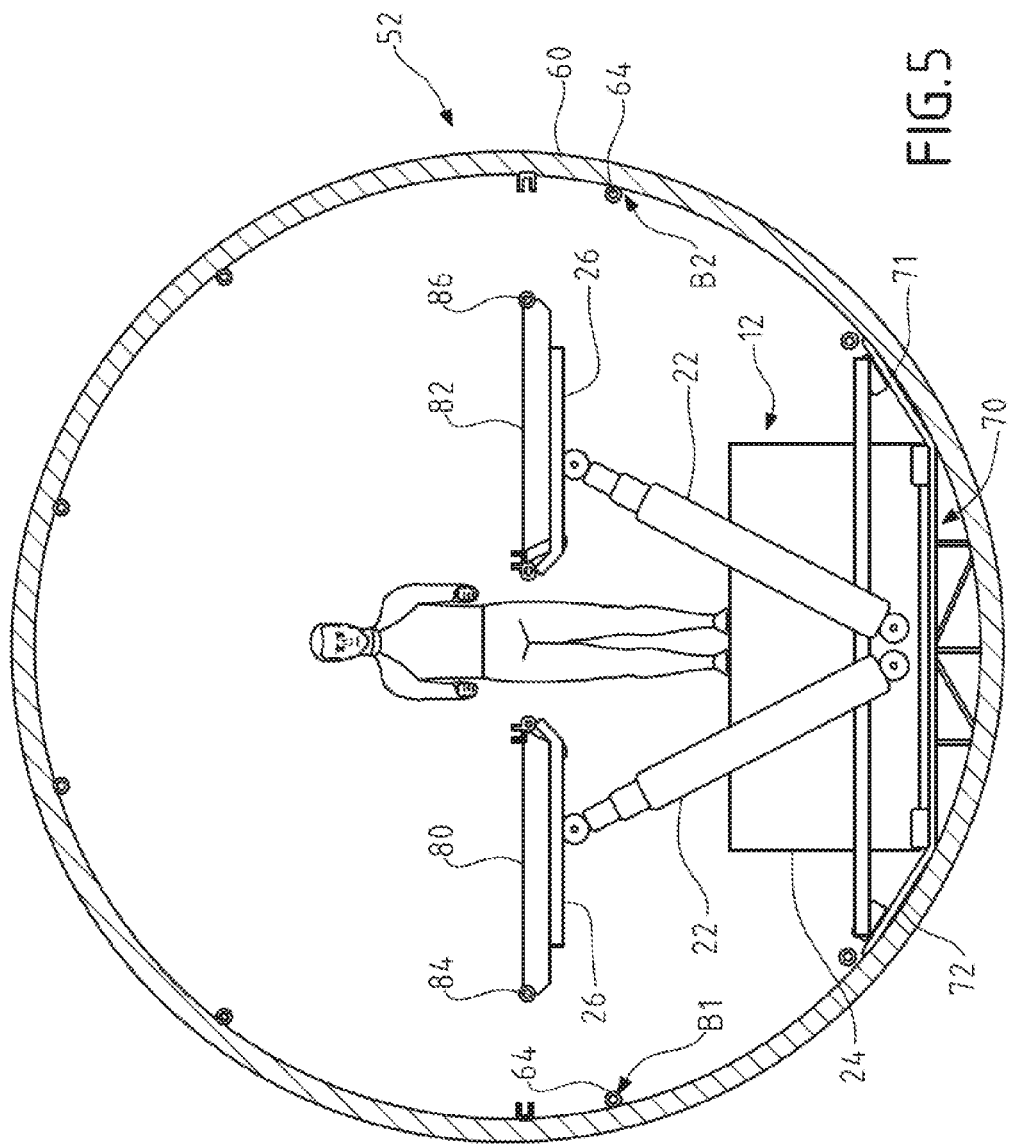

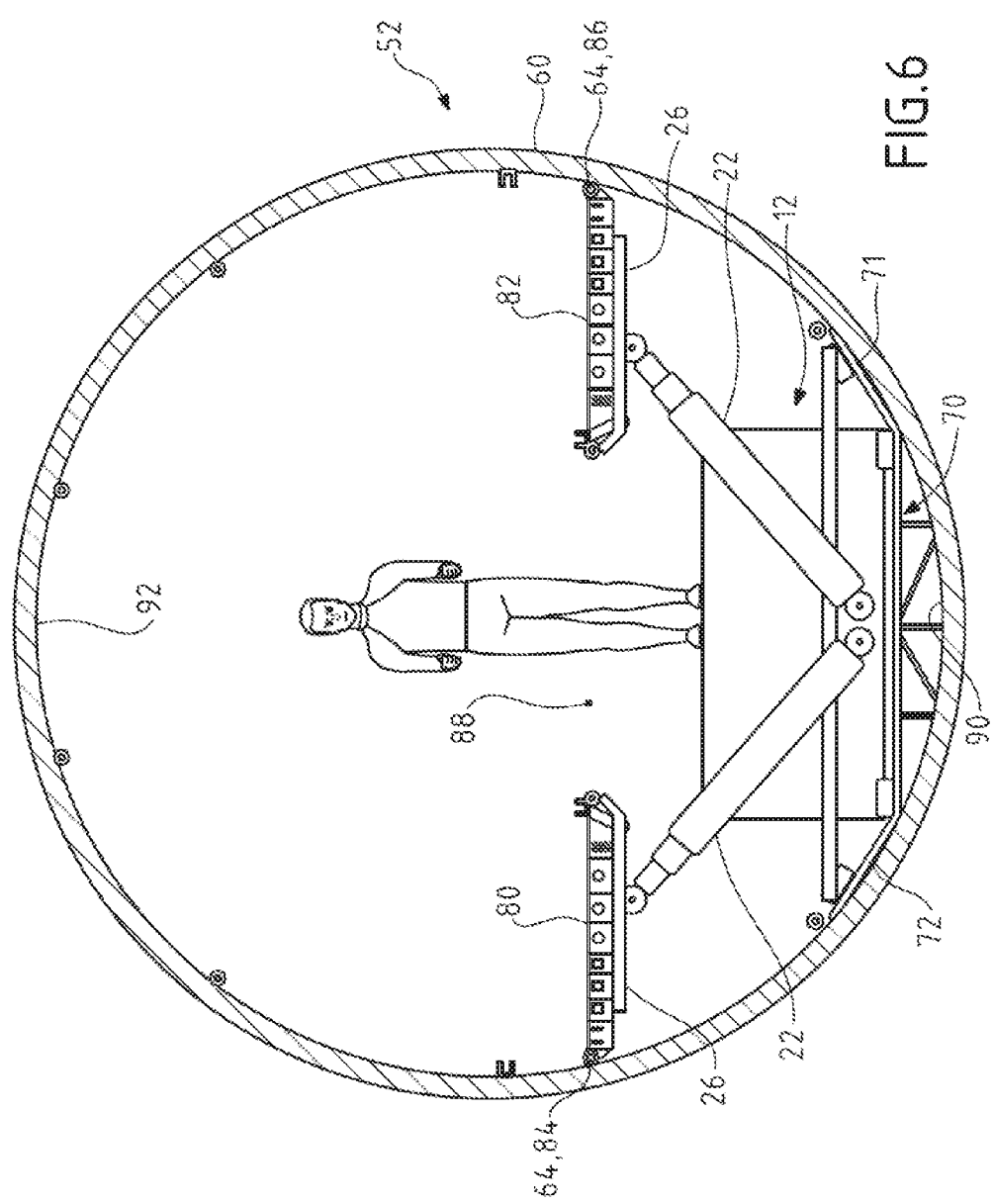

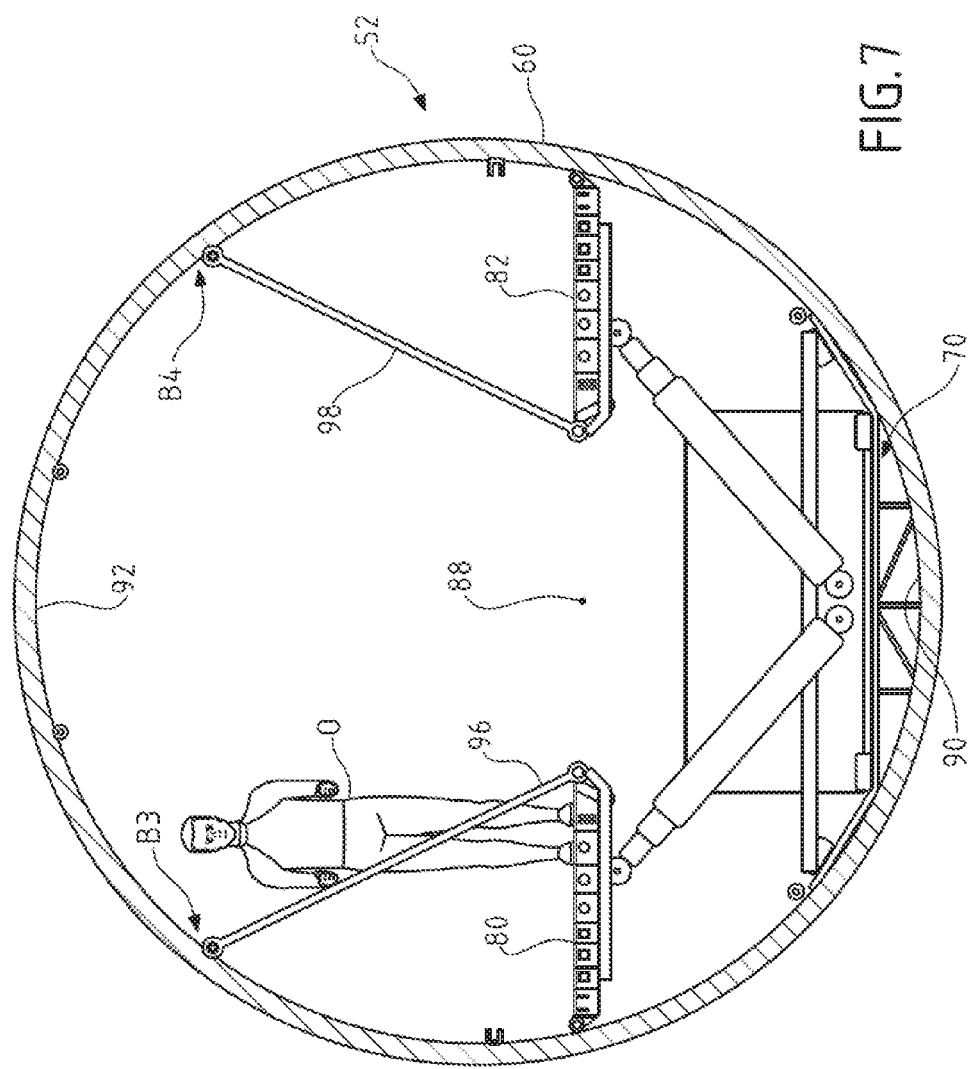

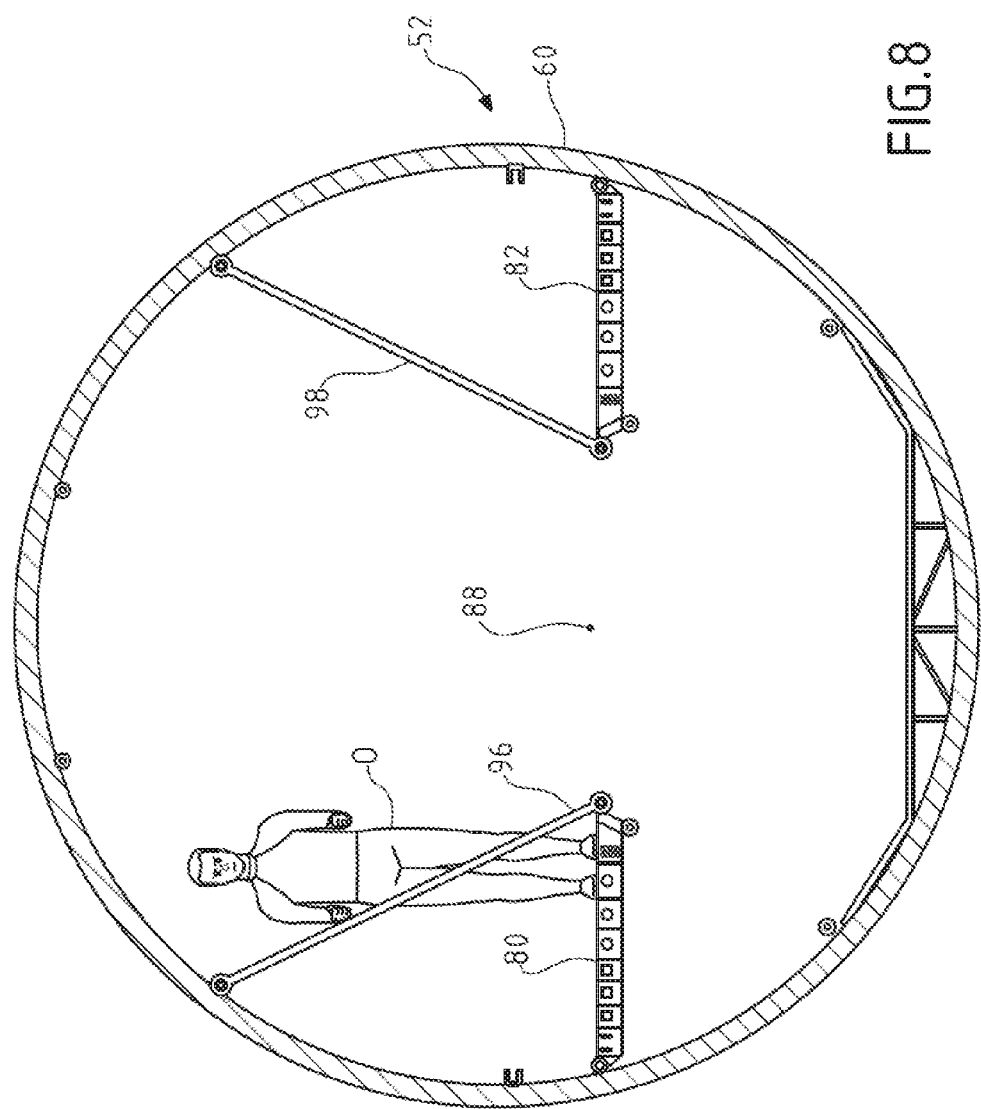

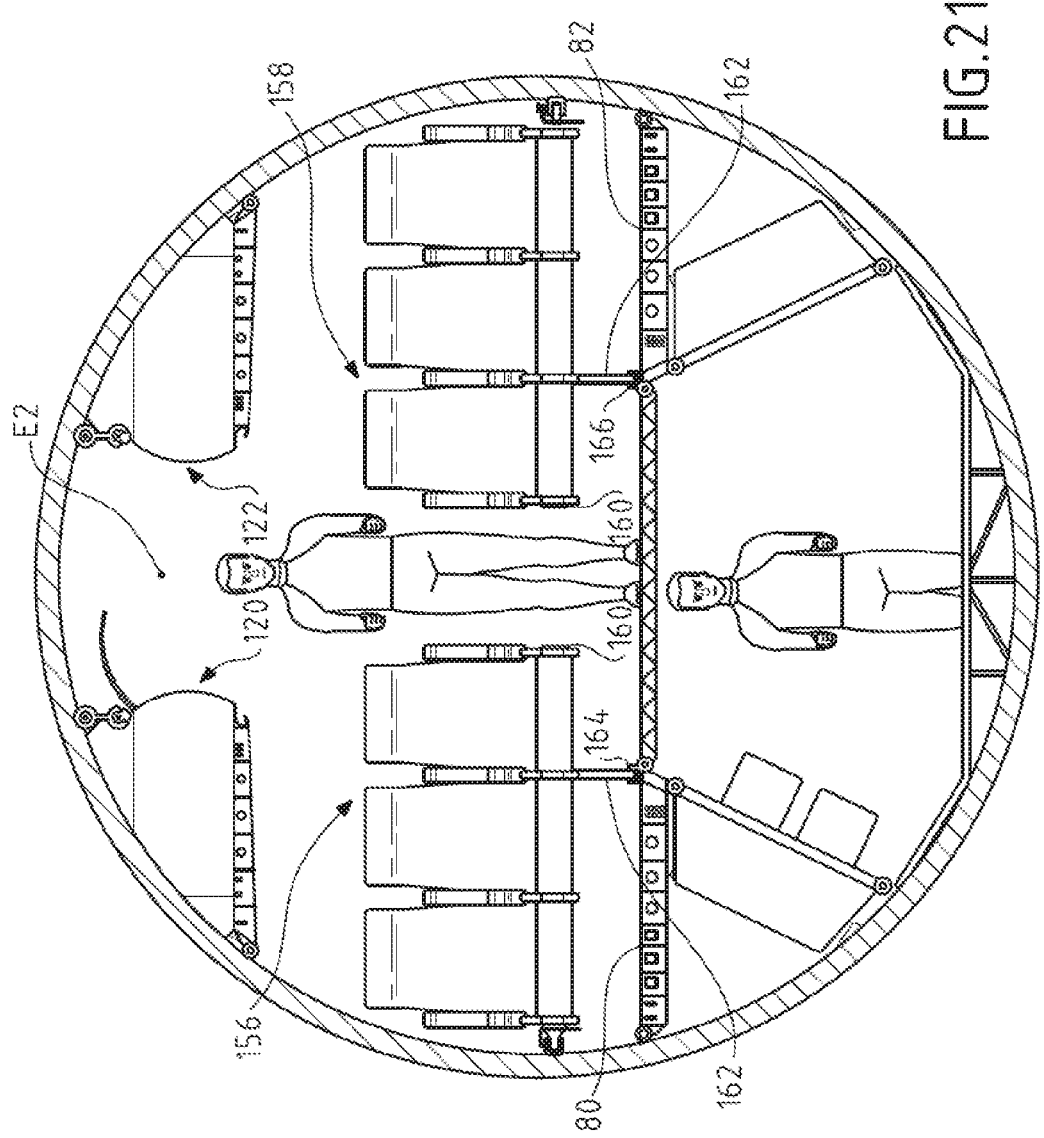

TOOLING ASSEMBLY FOR INTEGRATING A CENTRAL PART OF AN AIRCRAFT, ASSOCIATED METHOD AND AIRCRAFT THUS INTEGRATED

CROSS-REFERENCES TO RELATED APPLICATIONS

This application claims the benefit of the French patent application No. 1553502 filed on Apr. 20, 2015, the entire disclosures of which are incorporated herein by way of reference.

BACKGROUND OF THE INVENTION

The invention relates to a tooling assembly for the integration of a central aircraft part, an associated integration method and a duly integrated aircraft.

Conventionally, aircraft comprise a fuselage which is formed successively by the following elements arranged along a longitudinal axis of the aircraft, namely a nose, a central part called "general section" and a tail.

The integration of aircraft equipment items in the central part of the fuselage on the assembly line is a greatly time-consuming operation.

It would therefore be advantageous to reduce this integration time.

SUMMARY OF THE INVENTION

Thus, a subject of the present invention, according to a first aspect, is a tooling assembly for integrating a central part of the fuselage of an aircraft, wherein it comprises a tooling train which comprises a succession of movable carriages arranged behind one another aligned along a longitudinal axis which corresponds to the direction of movement of the tooling train and which is able to carry one or more items of aircraft equipment to be integrated in the central aircraft part.

Such a tooling train makes it possible to carry one or more items of aircraft equipment and to bring it or them into the central part of the fuselage in a single operation.

The aircraft equipment can be a single piece of aircraft equipment item carried simultaneously by a number of carriages or a number of aircraft equipment items carried by all or some of the set of carriages. This mobile tooling assembly provided with a high aircraft equipment item transport capacity compared to conventional tooling assemblies provides a time saving in the integration cycle. This mobile tooling assembly, whose length is less than or equal to the length of the central part of the fuselage, can transport one or more elongate equipment items of corresponding length.

According to other possible features, taken in isolation or in combination with one another:
- the carriages are linked to one another;
- the carriages are each equipped with a unit for supporting aircraft equipment item(s) and for positioning said aircraft equipment item or items at a predetermined location in the central part of the fuselage in order for them to be integrated;
- the unit for supporting and positioning aircraft equipment item(s) comprises telescopic arms each provided at their free end with an element comprising a reception surface for the aircraft equipment item or the part of equipment item concerned;
- the carriages are autonomous in that each of them is equipped with an energy source and a piloting system enabling said carriage to be moved, to be positioned relative to the other carriages and to maneuver its unit for supporting and positioning aircraft equipment item(s) automatically and in synchronism with the other carriages;
- the tooling assembly comprises:
  a set of electromagnetic signal transmitters/receivers carried by the carriages of the tooling train and
  a set of targets intended to be fixed to the central fuselage part and which are each targeted by the electromagnetic signal emitted and which reflect it to a receiver, said sets of transmitters/receivers and of targets being suitable for making it possible to position each carriage relative to its spatial environment;
- the number of carriages and the dimensioning of the units for supporting and positioning aircraft equipment item(s) depends on the aircraft equipment item or items to be supported and to be positioned in the central part of the fuselage and notably on their weight and on their flexibility;
- the tooling train is configured to operate in a programmed manner in carrying out predetermined operations;
- the carriages are suitable for rolling on a track.

Another subject of the invention, according to a second aspect, is a method for integrating at least one aircraft equipment item in a central part of the fuselage of an aircraft, wherein the method involves a tooling assembly as briefly explained above in order to integrate at least one aircraft equipment item in the central part of the fuselage. The use of such a tooling assembly makes it possible to considerably simplify the integration of the central part of the fuselage of an aircraft and to reduce the integration time. In effect, this tooling assembly makes it possible to integrate in the central part of the fuselage, in a single operation, an aircraft equipment item and, more particularly, an equipment item produced in the form of a single elongate module (for example, of a length corresponding to that of the tooling assembly). In the prior art, this integration phase required a multitude of operations, not only because the above-mentioned tooling assembly did not exist but also because of the fact that such an elongate module did not exist.

According to other possible features linked to the second aspect, taken in isolation or in combination with one another:
- the central part of the fuselage has a cross section with constant geometry;
- the central part of the fuselage comprising two opposite ends of which at least one end is open, the method comprises the introduction of the tooling train into the central part through the open end, to a working position, the tooling train carrying at least one aircraft equipment item to be integrated in the central part;
- the method comprises, performed automatically by the carriages, the positioning of said at least one aircraft equipment item at a predetermined location in the central part of the fuselage and, more particularly, the positioning of a right aircraft equipment item and of a left aircraft equipment item at respective locations situated on the two opposite internal sides of the central part of the fuselage facing each other;
- the method comprises the prior placement at the bottom of the central part of the fuselage of an interface which is suitable for supporting the movement of the carriages of the tooling train and the parking thereof in a working position in the central part;

the tooling train has a length which corresponds substantially to the length of the central part of the fuselage;

at least some of the carriages of which the tooling train is composed carry at least one aircraft equipment item to be integrated in the central part of the fuselage, said at least one equipment item having the form of an elongate module, the length of which corresponds to at least the greatest transverse dimension of the central part of the fuselage and which is intended to be integrated parallel to the longitudinal axis of the aircraft;

said at least one aircraft equipment item to be integrated in the central part of the fuselage comprises two lateral floor portions each forming an elongate single-piece module, the two lateral floor portions being conveyed by the train and positioned respectively at two opposite lateral edges of the fuselage facing each other, automatically, thus leaving a central corridor free between the two duly positioned lateral floor portions;

said at least one aircraft equipment item to be integrated in the central part of the fuselage comprises a first and a second plurality of upper lateral stowage compartments each forming an elongate single-piece module, the first and second pluralities of upper lateral stowage compartments being conveyed by the train and positioned respectively at two opposite lateral edges of the fuselage facing each other, automatically, thus leaving an upper central space free between the two pluralities of compartments.

Another subject of the invention, according to a third aspect, is an aircraft comprising a central fuselage part that is elongate along a longitudinal axis, wherein it comprises at least one aircraft equipment item which is integrated in the central fuselage part according to the method as briefly explained above, that is to say by using a tooling train as briefly explained above. Such an aircraft is thus equipped more easily and more rapidly than in the prior art.

According to other possible features linked to the third aspect, taken in isolation or in combination with one another:

said at least one aircraft equipment item has the form of an elongate module arranged parallel to the longitudinal axis, the elongate module having a length which is at least equal to the greatest transverse dimension of the central part of the fuselage; such an aircraft equipped with elongate module or modules is easier and quicker to integrate than an aircraft of the prior art; similarly, the module or modules can be removed in a single operation;

the elongate module has a length which is substantially equal to the length of the central part of the fuselage;

the central fuselage part has a cross section with constant geometry;

said at least one aircraft equipment item comprises two lateral floor portions each forming an elongate single-piece module, the two lateral floor portions being arranged respectively at two opposite lateral edges of the fuselage facing each other, thus leaving a central corridor free between the two lateral floor portions;

said at least one aircraft equipment item comprises a first and a second plurality of upper lateral stowage compartments each forming an elongate single-piece module, the first and second pluralities of upper lateral stowage compartments being arranged respectively at two opposite lateral edges of the fuselage facing each other, thus leaving an upper central space free between the two pluralities of compartments.

BRIEF DESCRIPTION OF THE DRAWINGS

Other features and advantages will become apparent from the following description, given purely as a nonlimiting example and with reference to the attached drawings, in which:

FIGS. 2a-c are successive schematic views showing the introduction of the tooling assembly of FIG. 1 into an aircraft;

FIG. 3 is a schematic view of a cross section of a central fuselage part of an aircraft according to an embodiment of the invention;

FIG. 4 is a schematic view illustrating a support interface forming the bottom of the central part of FIG. 3;

FIGS. 5 and 6 are two schematic views illustrating the simultaneous fitting of two lateral floor portions in the central part of FIG. 4;

FIGS. 7 and 8 are two schematic views illustrating the fitting of temporary attachment elements for the two lateral floor portions;

FIG. 21 illustrates the fitting of other aircraft equipment items.

DETAILED DESCRIPTION OF THE PREFERRED EMBODIMENTS

Figure 1A:
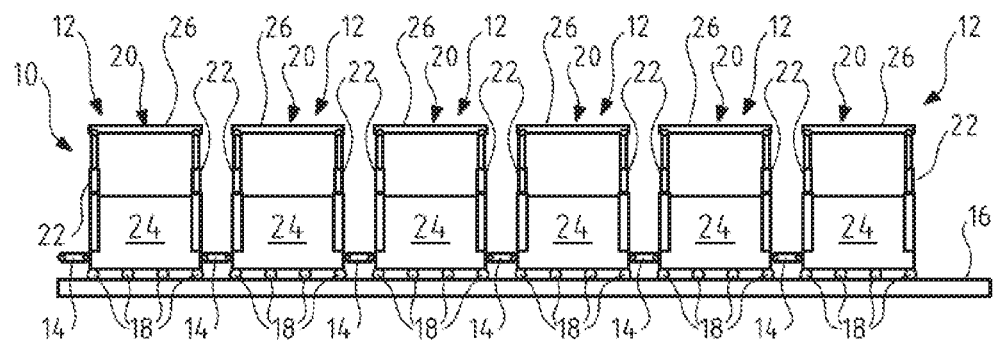
FIG. 1a is a schematic view of a tooling assembly according to an embodiment of the invention.

As represented in FIG. 1a, a tooling assembly according to an embodiment of the invention comprises a tooling train 10 which comprises a succession of movable carriages or wagons 12 arranged behind one another which are, for example, linked to one another, two by two, by link elements 14 (two consecutive carriages are thus linked together). In the figure only a few carriages are represented but the train 10 can be longer, the number of carriages being adapted to the requirements. The carriages are aligned along a longitudinal axis so as to form the tooling train. The carriages are thus arranged behind one another aligned along a longitudinal axis which corresponds to the direction of movement of the train. The train can move forward in this direction and also move back. The longitudinal axis of alignment of the carriages is parallel to a longitudinal axis of the aircraft when the train moves inside an aircraft.

The carriages are suitable for moving on a track 16 via mobile members 18 linked to each of the carriages and which are suitable for entering into contact with the track 16 and for moving on this track relative to the carriage concerned. The track is generally flat in an aircraft and it therefore does not generally include any obstacles to be crossed.

The mobile movement members 18 are, for example, wheels or castors which can alternatively take other forms such as caterpillar tracks, articulated feet, etc.

The carriages 12 each comprise a unit 20 for supporting and positioning aircraft equipment items allowing each carriage notably to carry one or more aircraft equipment items or a part of an aircraft equipment item. The unit 20 comprises a set of telescopic arms 22, for example, four per carriage.

Each carriage comprises a box section 24 on which are mounted the arms 22: two arms mounted on the front face of the box section and two on the rear face. In FIG. 1a, only one arm of the front face and one arm of the rear face are illustrated.

The telescopic arms 22 are each provided at their free end with an element 26 comprising a reception surface (for example, here, an upper face of the element) which has dimensions adapted to allow it to serve as support for the aircraft equipment item or for the part of equipment item concerned. In the figure, the element 26 is a support-forming plate which is common to the two arms 22.

The element 26 can also be common to the symmetrical other two arms that are not visible in the figure.

Alternatively, each element 26 can be distinct for each arm.

These different configurations of element(s) 26 relative to the arms 22 depend on the aircraft equipment items to be transported and to be manipulated, as do the number of arms and their arrangement on the carriages.

Each carriage 12 is a tool element which is autonomous with respect to the other carriages: it has its own energy source and itself handles, automatically and in synchronism with the other carriages, the operations of movement of said carriage, of positioning thereof relative to the other carriages and to the environment, and of positioning of the aircraft equipment item or items in this environment (via its unit 20).

Figure 1B:
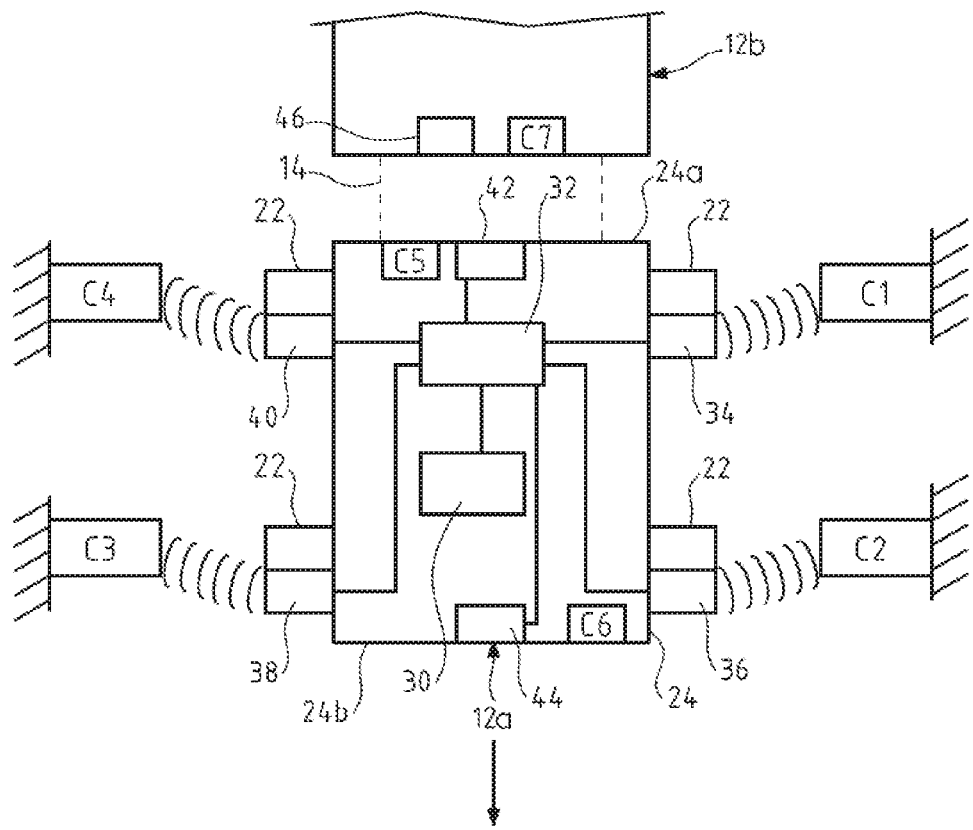
FIG. 1b is a schematic view of certain elements forming the tooling assembly of FIG. 1a in plan view.

As represented in FIG. 1b, the box section 24 of a carriage, here denoted 12a for the purposes of the explanation (this carriage is identical to one of those illustrated in FIG. 1a), comprises a battery 30 and a computer 32 which is programmed to act as a carriage piloting system.

The carriage comprises a set of pairs of transmitters and receivers of electromagnetic signals, such as laser beams. A transmitter/receiver pair 34, 36, 38, 40 is, for example, carried by each of the arms 22.

Targets C1-C4 are positioned in the environment of the carriage, here on distinct supports or on distinct locations of a same support.

The carriage is also equipped with other pairs 42, 44 of transmitters and receivers of electromagnetic signals and which are arranged on or in the box section 24, for example, respectively linked with the rear 24a and front 24b faces thereof (the direction of movement of the carriage is indicated by the downward vertical arrow). The carriage carries targets C5, C6 respectively on rear 24a and front 24b faces.

Behind the carriage 12a, there is another carriage 12b (this carriage is identical to one of those illustrated in FIG. 1a) to which it is linked by the link or attachment elements 14. This carriage 12b comprises a pair 46 of transmitters and receivers of electromagnetic signals and a target C7, both carried by the front face of the carriage.

In operation, the transmitter of each pair or of some of the pairs carried by the arms (depending on the programming of the computer 32) emits an electromagnetic signal towards a target which reflects it towards the associated receiver of the pair. This makes it possible to know the position of the arm concerned of the carriage relative to the target and therefore to the spatial environment in as much as the position of the target is known.

Moreover, by operating thus with the pair 42 and the target C7, it is possible to determine the position of the carriage 12a relative to the carriage 12b. Similarly, the pair 46 and the target C5 make it possible to determine the position of the carriage 12b relative to the carriage 12a. The pair 44 and the target C6 are used in a corresponding manner in relation to the carriage (optional) not represented which is placed in front of the carriage 12a.

These various signals obtained by the electromagnetic signal transmitter and receiver pairs are transmitted to the computer which deduces therefrom the relative position of the arms in relation to their environment and of the carriage 12a relative to the carriages in front (not represented) and behind (12b). The knowledge of the position of the arms relative to their spatial environment and notably to the support structure on which the targets C1-C4 are arranged makes it possible to control the appropriate positioning of the arms in direction (orientation in space) and in extension in order to be able to accurately position the aircraft equipment item or items that these arms support.

It will be noted that the number of targets can vary. There is in fact no need to have a different target for each arm. However, there are generally more targets than arms. The position of the targets and of the transmitter and receiver pairs on the carriage can vary.

The pairs 34 to 40 can be arranged alternately on the box section. The pairs 42, 44, 46 and the targets C5-C7 can be placed differently to fulfill the same function and their number can vary.

Each carriage can also comprise a greater number of pairs and/or targets to be positioned relative to its fixed environment and to the other carriages.

Moreover, other known alternative technical means can be used to know the position of the carriages relative to one another and relative to their environment.

The number of carriages of which the tooling train is composed and the dimensioning of the support and positioning units 20 depend on the aircraft equipment item or items to be transported and to be manipulated, notably on their weight and on their flexibility.

FIGS. 2a to 2c illustrate the use of the tooling assembly of FIGS. 1a and 1b to integrate one or more aircraft equipment items in an aircraft 50, more particularly in the central part of the fuselage 52. The central fuselage part is open at its front end 52a and closed at its opposite rear end to which the tail 54 equipped with the vertical stabilizer 56 is coupled. The aircraft has a longitudinal axis X along which the central part of the fuselage 52 extends.

The central fuselage part 52 has a cross section with constant geometry (unchanging section) over its entire length and, for example, a circular geometry: the central fuselage part 52 is therefore of generally cylindrical form. The tail 54 and the nose which are not represented are, for their part, each parts with changing cross section, that is to say that their cross section changes geometrically along the longitudinal axis X.

As represented, the tooling train 10 of FIGS. 1a and 1b is introduced into the cylindrical internal space of the central part of the fuselage 52 through the open end 52a (FIG. 2a), then advances in this part (FIG. 2b) to a working position (FIG. 2c), to perform there the predetermined operations which have been programmed in the computer of each carriage. The carriages that make up the tooling train 10 which is inside the aircraft are aligned relative to one another along an axis parallel to the longitudinal axis X of the aircraft. The tooling train 10 thus moves longitudinally inside the aircraft in order to bring the carriage or carriages carrying the equipment item or items to the appropriate location which can, for example, be situated at any distance from the open end 52a towards the tail.

In this example, the set of carriages of which the tooling train 10 is composed has a length which corresponds substantially to the length of the central part of the fuselage 52. This makes it possible to introduce therein and install therein, automatically in position, at a predetermined location (notably for all or part of the internal length of the central part of the fuselage), one or more aircraft equipment items. Such equipment items are each, for example, in the form of a single elongate module which is supported by all the carriages. Each carriage supports only a part of the module and is configured to position only that part inside the aircraft in synchronism with the other carriages. It will be noted that an elongate module capable of being integrated by the tooling train 10 has a length which is at least equal to the greatest transverse dimension (or width) of the central part of the fuselage (this width corresponds to the width of the cross section which is the diameter of the circle in the case of a circular cross section). In the example illustrated in FIGS. 2a-c, the module has substantially the length of the central part of the fuselage 52 which corresponds also to the length of the tooling train. The cylindrical form (or more generally the form with constant geometry) of the internal space of the central part 52 makes it possible to introduce the tooling train over the entire (internal) length of the central part with the module carried by the train and to install this module in a single operation in this central part. This module is integrated in the aircraft by the train 10 parallel to the longitudinal axis X. In FIGS. 2a-c, the aircraft equipment item module carried by the train is merged therewith. However, elongate modules are illustrated in the subsequent figures. It will be noted that the tooling train can also be used to remove equipment items and/or modules located in the aircraft. The carriages of which the tooling train is composed have a width which is adapted to the width of the internal space of the aircraft in which they move. Generally, this internal space can accommodate only one carriage widthwise as illustrated in the figures which will be described later.

FIG. 3 shows a cross section of the central part of the fuselage 52 which, in this embodiment, is circular, all of the central part of the fuselage, called "general section of the aircraft" being of cylindrical form. In the figure, a frame of the primary structure of the fuselage has been represented, it being understood that the fuselage comprises a succession of similar frames parallel to one another and secured together in a known manner.

The central part of the fuselage is empty except for fixing 62, 64 or attachment elements such as clamps to which the aircraft equipment items will be fixed during the integration phase. The aircraft equipment items which will be conveyed into the central fuselage part 52 are already equipped with complementary fixing or attachment elements in order to reduce the integration time. As an example, the fixing elements and their complementary fixing elements form, for example, links by clamps of clevis and tenon type assembled to one another along an axis.

The following description is given in relation to the cross section of FIG. 3 and the subsequent figures, but of course applies to all the cross sections defining the length of the central part of the fuselage 52.

FIG. 4 illustrates a preliminary step S1 of fitting of an interface 70, called cargo interface, on the bottom portion of the fuselage forming the bottom of the central part of the fuselage. The interface 70 is a structure forming a reinforced bottom floor (track for the carriages) which is suitable for supporting the movement of the tooling train loaded thereon, and the parking of the tooling train in a working position.

FIGS. 5 and 6 illustrate the fitting of a first type of aircraft equipment items to be integrated which comprises two lateral floor portions 80, 82 each forming an elongate single-piece module. In this example, the two modules each have the length of the central fuselage part.

Each equipment item is first loaded onto the carriages 12 of the train 10 (step S2). The train 10 is introduced into the central fuselage part and each equipment item is transported and brought into the working position of FIG. 5 by virtue of the movement of the carriages 12 on the interface 70 (step S3) in accordance with the steps of FIGS. 2a-c.

Once at their working position, the carriages which are loaded symmetrically are stable. The lateral stability of the carriages can however be increased by two additional lateral tracks 71, 72 situated on either side of the interface 70.

Each lateral floor portion 80, 82 is supported by the elements 26 situated at the end of the telescopic arms 22 of the carriages such as the carriage of FIG. 5. When two or more equipment items are transported simultaneously by carriages and will be positioned at different locations, notably situated on two opposite internal sides facing the central part of the fuselage (right and left sides), it is necessary to have a number of arms (at least two per carriage). These arms can assume different axial orientations (according to a cross-sectional view) in order to position the equipment items that they carry at the appropriate locations.

All of the pairs of transmitters and receivers and all the targets described in relation to FIG. 1b are used here to drive and automatically accompany the positioning of the two lateral floor portions 80, 82. The targets have been installed (in the step S1 or beforehand) at predetermined points of the fuselage which are not necessarily situated at the locations of the fixing elements but at a known distance therefrom.

As represented in FIGS. 5 and 6, the carriages 12, programmed appropriately, automatically and symmetrically direct and deploy their telescopic arms 22 which move apart towards the outside of the carriages. This movement is made possible by virtue of the guidance provided by the signals supplied by all the pairs of transmitters and receivers cooperating with associated targets (not represented in the figures).

The step S4 of the method (FIG. 2d) corresponds to the simultaneous automatic positioning of the right lateral floor portion 80 (right elongate module) and of the left lateral floor portion 82 (left elongate module) respectively on two opposite internal lateral edges of the fuselage facing each other, denoted B1 and B2. The edges B1, B2 are equipped with fixing elements 64 which will cooperate with respective complementary fixing elements 84, 86 of the lateral portions 80, 82. The operation of attachment of the fixing elements to one another is, for example, carried out manually. When thus positioned in their respective lateral locations, the lateral floor portions 80, 82 leave a central corridor 88 free between them. This central corridor extends from the bottom 90 of the raised central part via the interface 70 for the support of the tooling train to the ceiling 92 (FIG. 6).

It will be noted that the carriages of the tooling train are equipped with specific balance sensors which measure, in real time, the pressure on the different floor bearings of the carriages. This enables the computer managing the operations performed by the carriages to optimally determine the speeds and the centering of the loads while the operations are being carried out.

The simultaneous positioning by the carriages of a right aircraft equipment item and of a left aircraft equipment item balances the load. The tooling train does not therefore need to be stabilized in roll.

The tooling train is then removed from the aircraft (step S5).

FIGS. 7 and 8 illustrate a step S6 of the method (FIG. 2d) during which temporary attachment elements 96, 98, fitted manually, for example, are fixed, on the one hand, to each of the two lateral floor portions 80, 82 and, on the other hand, to an upper edge B3, B4 of the fuselage situated where the corresponding lateral floor portion is positioned. The temporary attachment elements 96, 98 are fixed by using attachments provided for other aircraft equipment items in order to temporarily secure the lateral floor portions 80, 82 and make it possible notably for an operator O to walk on top.

FIGS. 9 to 13 illustrate the fitting of a second type of aircraft equipment item which comprises a first and a second plurality of cabinets suitable for accommodating each of the systems. They are notably electrical and/or electronic systems, air conditioning and cooling systems, water dispensing and recovery systems and avionics systems.

The cabinets are preloaded (step S7 of FIG. 2d) on other rolling carriages 100 of another tooling train which each comprise a platform formed by a double deck 100a, 100b: the upper deck 100a is mounted to slide (by command or manually) laterally relative to the lower deck 100b. The cabinets are arranged on the upper decks 100a of the carriages. By way of example (FIG. 9), two cabinets M1, M2 rest on each deck 100a. Alternatively, the cabinets can be loaded on the box sections 24 of the carriages 10 of the tooling train 10.

Figure 9:
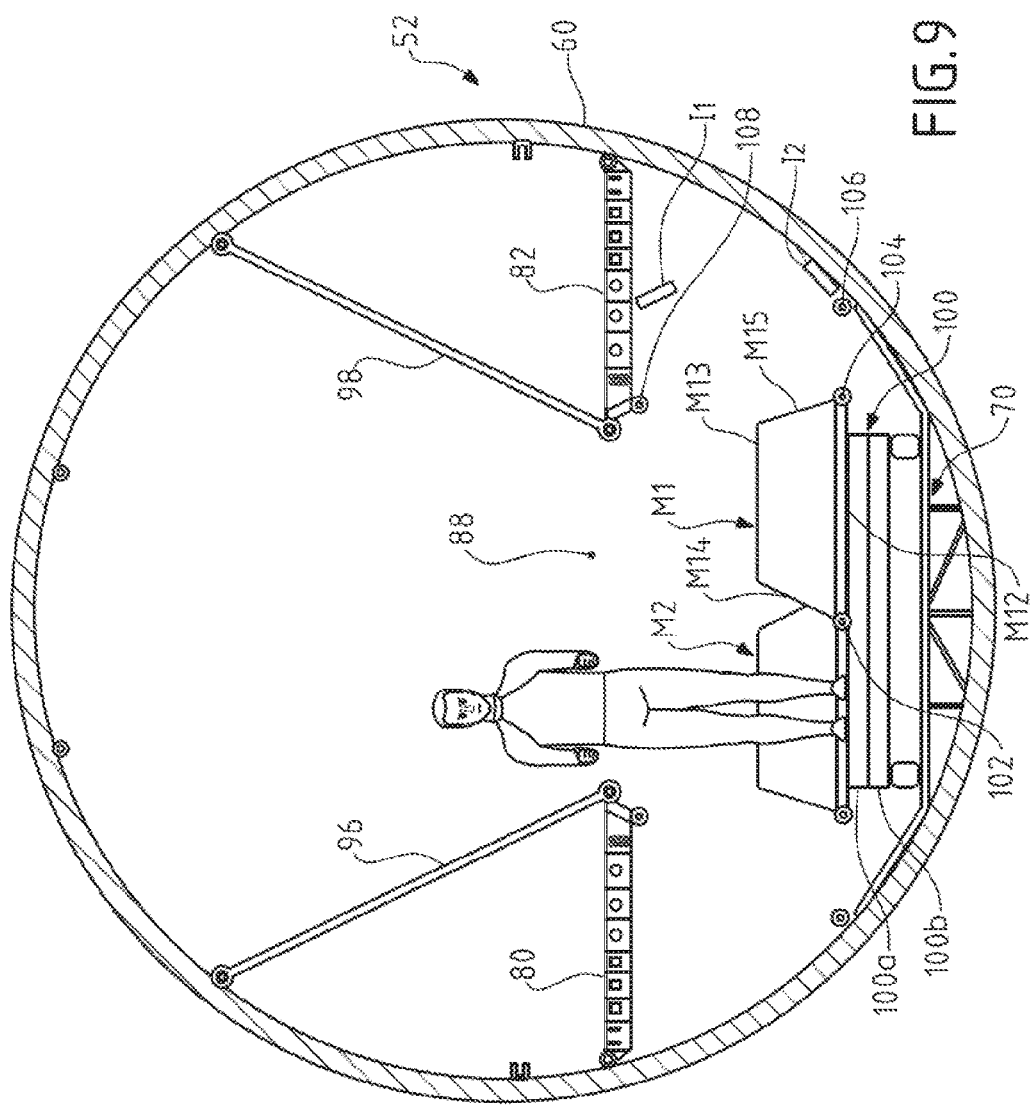
FIGS. 9 to 13 illustrate the fitting of another type of aircraft equipment item which comprises a first and second plurality of cabinets.
Figure 10:
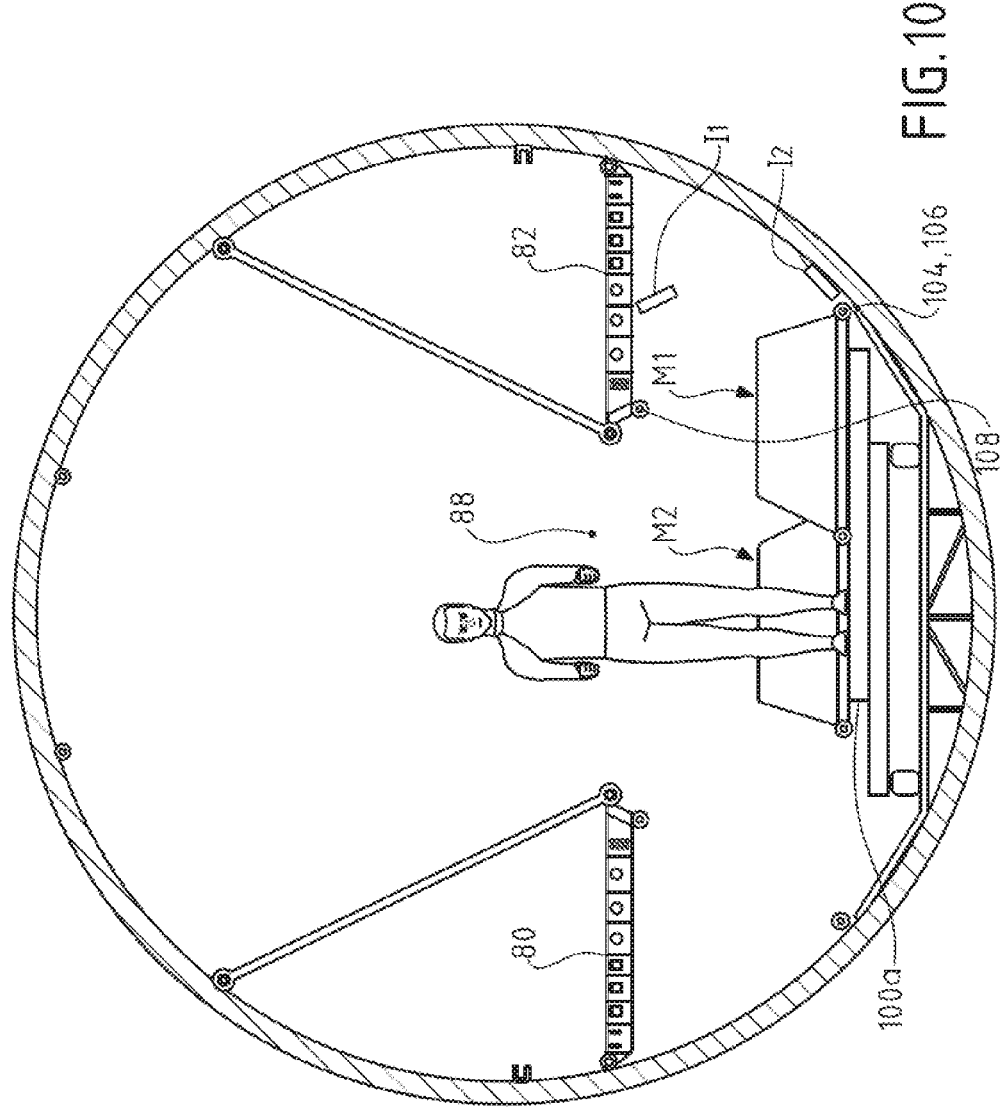
Figure 11:
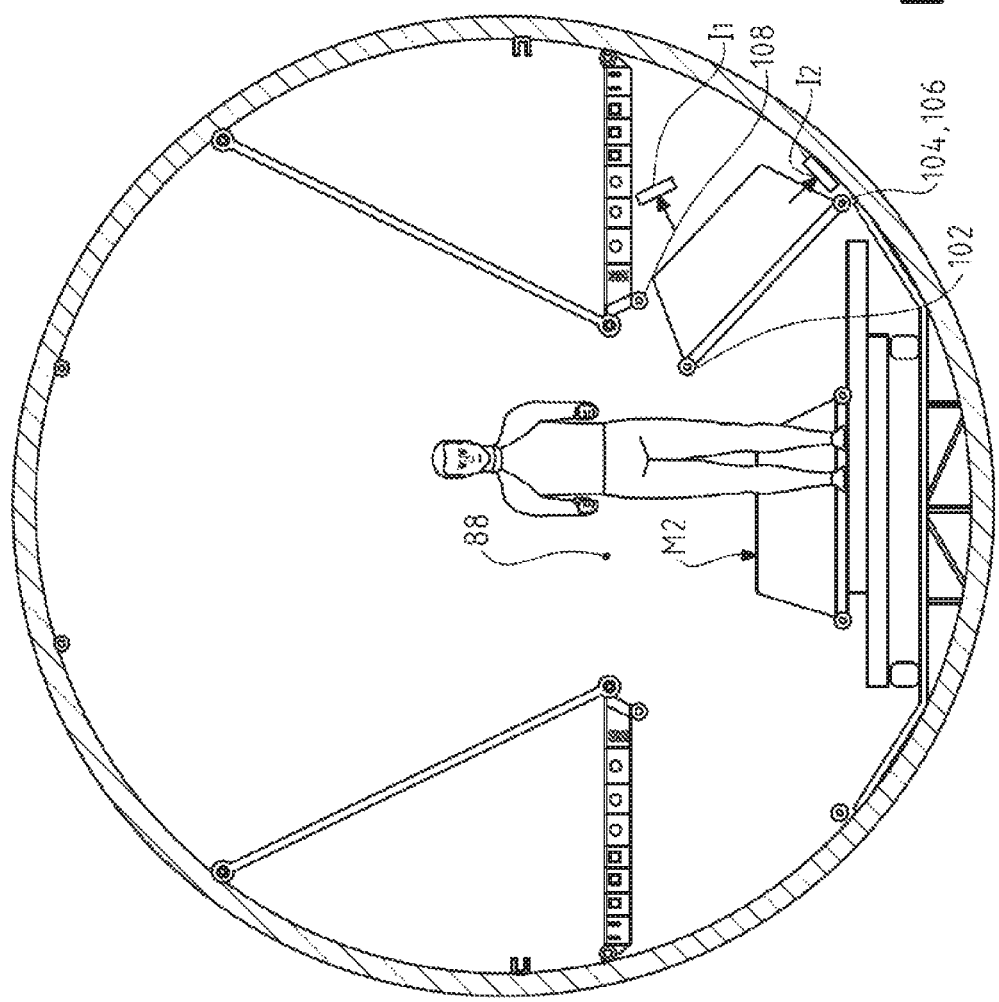
Figure 12:
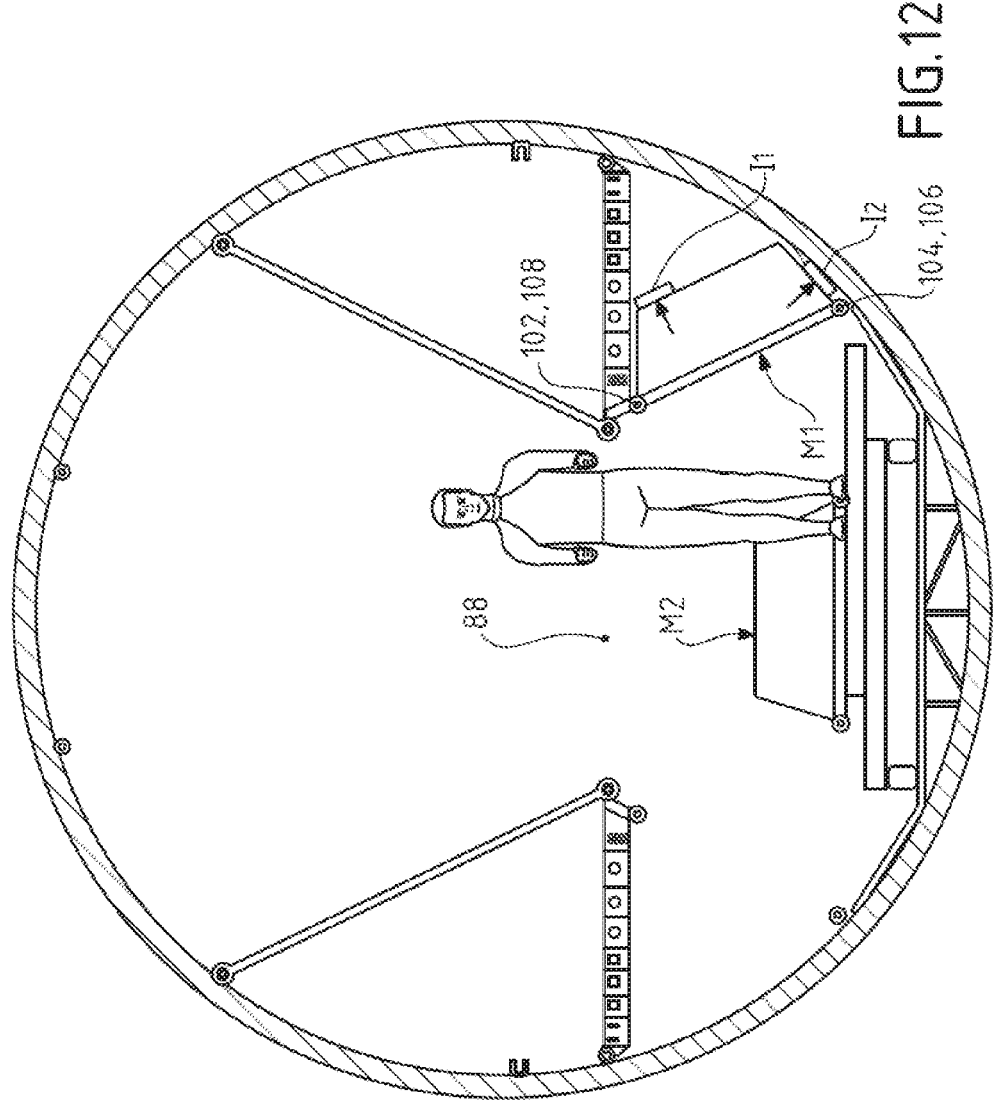
Figure 13:
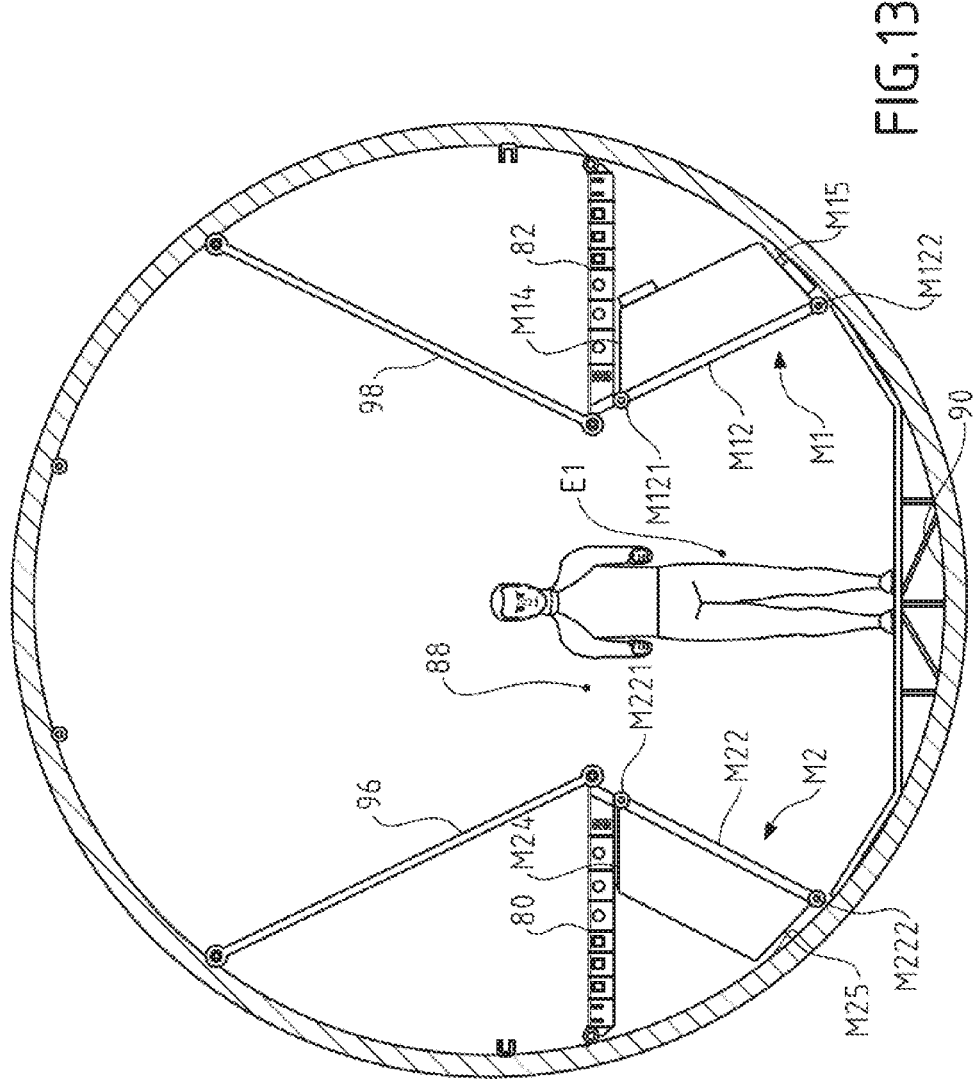

The tooling train comprising the carriages 100 linked to one another is introduced into the central part of the fuselage as illustrated in FIGS. 2a-c in order to bring the carriages 100 carrying the cabinets M1, M2 into the working position of FIG. 9 (step S8).

As illustrated, the two cabinets M1, M2 are arranged offset transversely in order to facilitate the mounting of one of the cabinets on the left side of the central corridor 88 and the other cabinet on the right side of this corridor (step S9).

Each cabinet has, from a cross-sectional view, a generally trapezoidal form. The generally trapezoidal form of the cabinet M1 is formed, on the one hand, by two large front and rear faces, parallel to one another, M12, M13 and, on the other hand, by two small faces, M14, M15, inclined to one another and adjacent to the large faces. The large front face M12 arranged against the upper deck 100a is equipped, at its two opposite ends, with fixing elements 102, 104.

The aircraft is equipped with electrical, aeraulic and hydraulic interfaces I1, I2 necessary to the operation of the system cabinets M1 and which are arranged in a lateral zone situated under the lateral floor portion 82. These interfaces will ensure the link with electrical, aeraulic and hydraulic links of the aircraft (not represented) which extend longitudinally in this lateral zone.

Once in position, the upper deck 100a slides laterally (FIG. 10) towards the lateral zone where the cabinet M1 has to be mounted (left side of the central part of the fuselage) in order to bring the fixing elements 104 of the cabinet into line with the fixing elements 106 of the lower edge back from the fuselage (situated under the lateral floor portion and set back relative to the free end thereof) and to proceed to fix the lower part of the cabinet. The cabinet M1 is then tilted upwards (FIGS. 11 and 12) in order to proceed to fix together the fixing elements 102 of the upper part of the cabinet with the fixing elements 108 of the free end of the lateral floor portion 82. During this tilting/pivoting movement, the cabinet is coupled to the interfaces I1 and I2 in order to be connected to the electrical, aeraulic and hydraulic network of the aircraft.

The cabinet M2 (FIG. 13) is then positioned identically in the lateral zone situated under the lateral floor portion 80 (right side of the central part of the fuselage).

The cabinets M1, M2 of the two pluralities of cabinets are thus positioned along two lines parallel to the longitudinal axis of the central fuselage part, on either side of a central space E1. This space corresponds to the part of the central corridor 88 situated between the height at which the two lateral floor portions 80, 82 are positioned and the bottom 90 of the central part of the fuselage. It will be noted that the other cabinets not visible in the figures are arranged one behind the other adjacent to one another in order to form the above-mentioned two pluralities of cabinets.

Thus positioned (FIG. 13), the fittings M1, M2 each have their front face M12, M22 situated facing the central space E1 and inclined towards this central space in such a way that the upper end M121, M221 of the front face is closer to said central space than the lower end M122, M222 set back from said front face.

The lateral faces M14, M15, M24, M25 of the respective cabinets M1, M2 are formed in such a way as to be as close as possible, respectively, to the lateral floor portions and the adjacent walls of the fuselage.

In this position the duly installed cabinets are capable of supporting the lateral floor portions 80, 82 by virtue of their structural uprights which are mounted between each lateral floor portion and the lower internal edge of the fuselage set back relative to the extension formed by the free end of the corresponding lateral floor portion.

Figure 14:
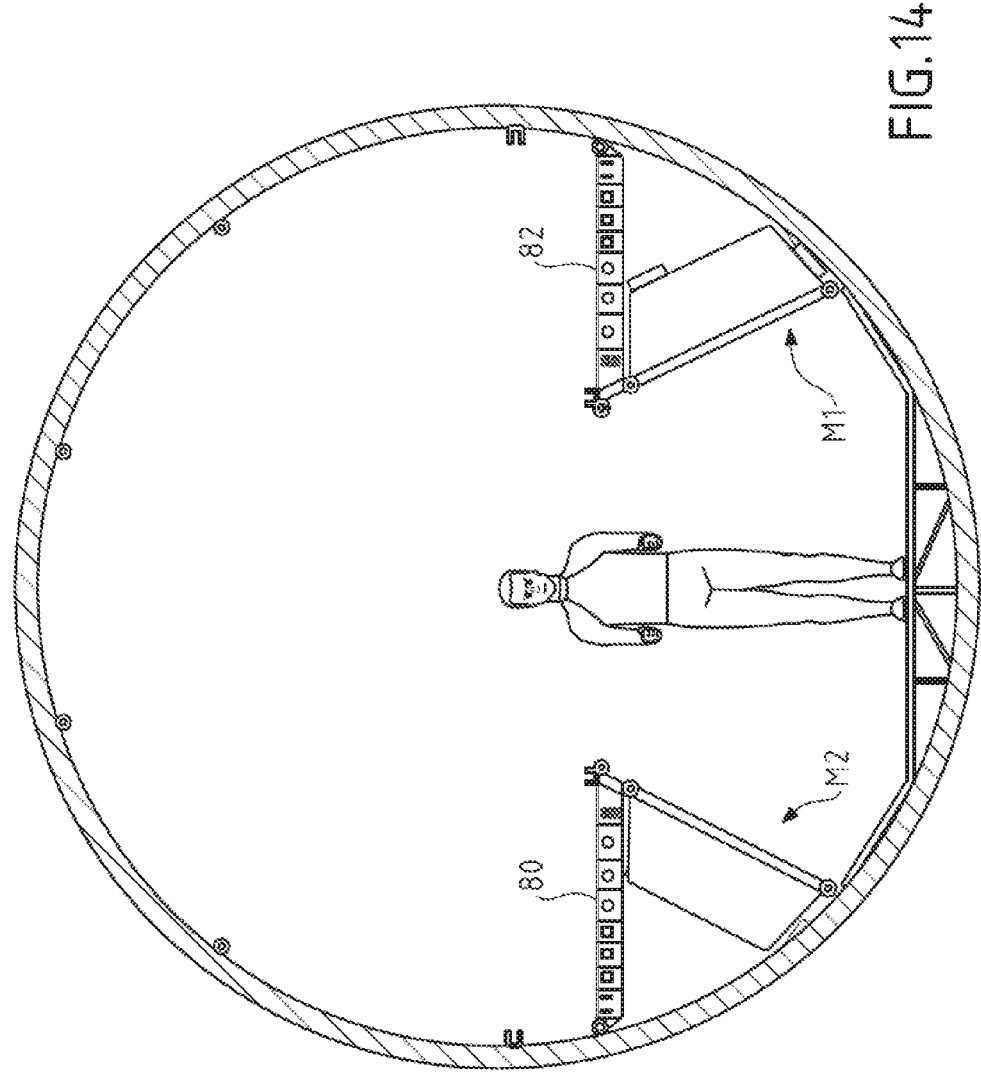
FIG. 14 illustrates the removal of the temporary attachment elements for the two lateral floor portions.

The method then comprises a step S10 of removal/dismantling of the temporary attachment elements 96, 98 (securing link rods) to obtain the configuration of FIG. 14. The fixing elements of the fuselage are thus freed to accommodate other equipment items with their complementary fixing elements.

FIGS. 15 to 19 illustrate the fitting of a third aircraft equipment item which comprises a first and a second plurality of upper lateral stowage compartments 120, 122 each forming an elongate single-piece module. In this example, the two modules are each as long as the central fuselage part. Each plurality of compartments corresponds to a succession of compartments arranged one against the other, two-by-two and secured together. Each compartment in itself is, for example, a compartment of the prior art and their adjacent partitions are fixed to one another (for example, by screwing, bonding, etc.). Alternatively, one of the adjacent partitions of each pair of two adjacent compartments is removed and only one partition separates the two adjacent compartments.

For this phase of integration of a new type of elongate module, the tooling train 10 formed by the carriages 12 is reused.

This third type of aircraft equipment item is loaded onto the carriages 12 of the train (step S11) which are then introduced into the central part of the fuselage by rolling over the interface 70 in accordance with the steps of FIGS. 2a-c. The equipment item is thus transported and brought into the working position of FIG. 15 (step S12).

Figure 15:
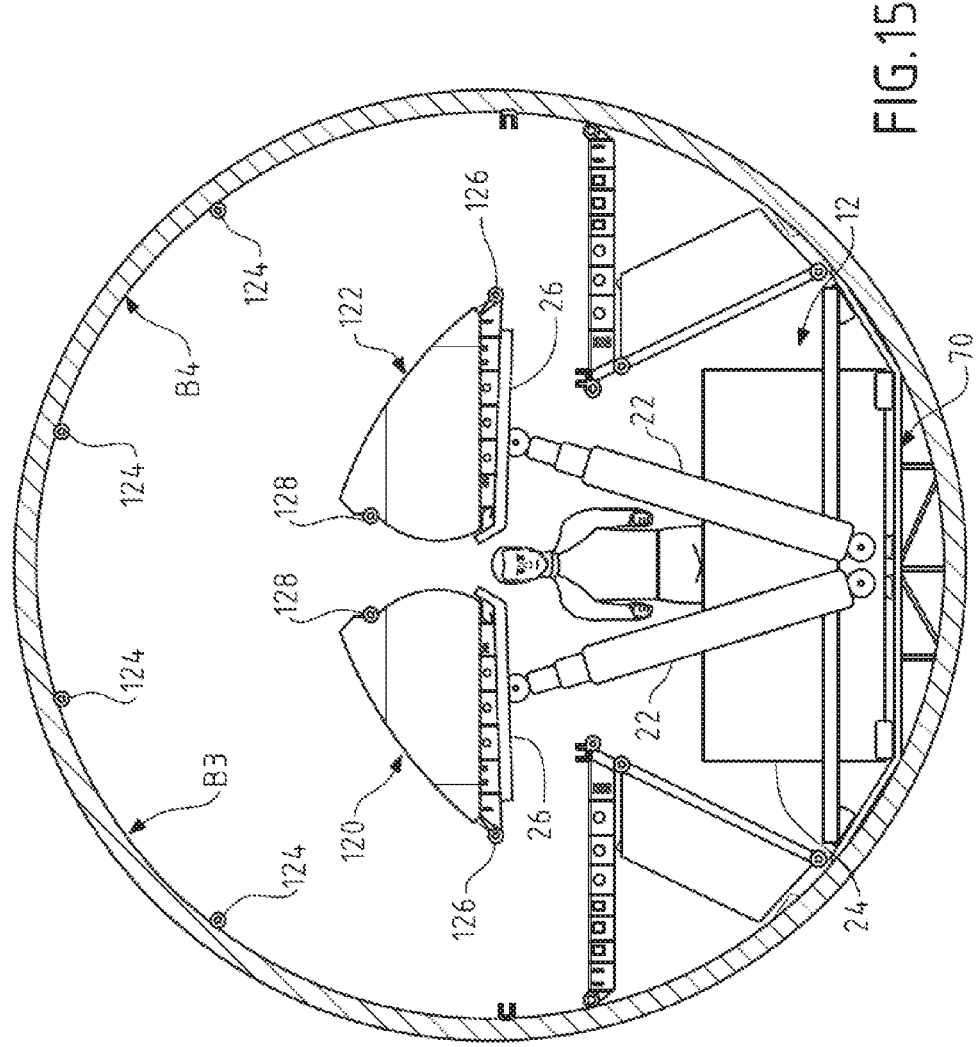
FIGS. 15 to 19 illustrate the simultaneous fitting of a first and a second plurality of upper lateral stowage compartments in the central part of FIG. 14.
Figure 16:
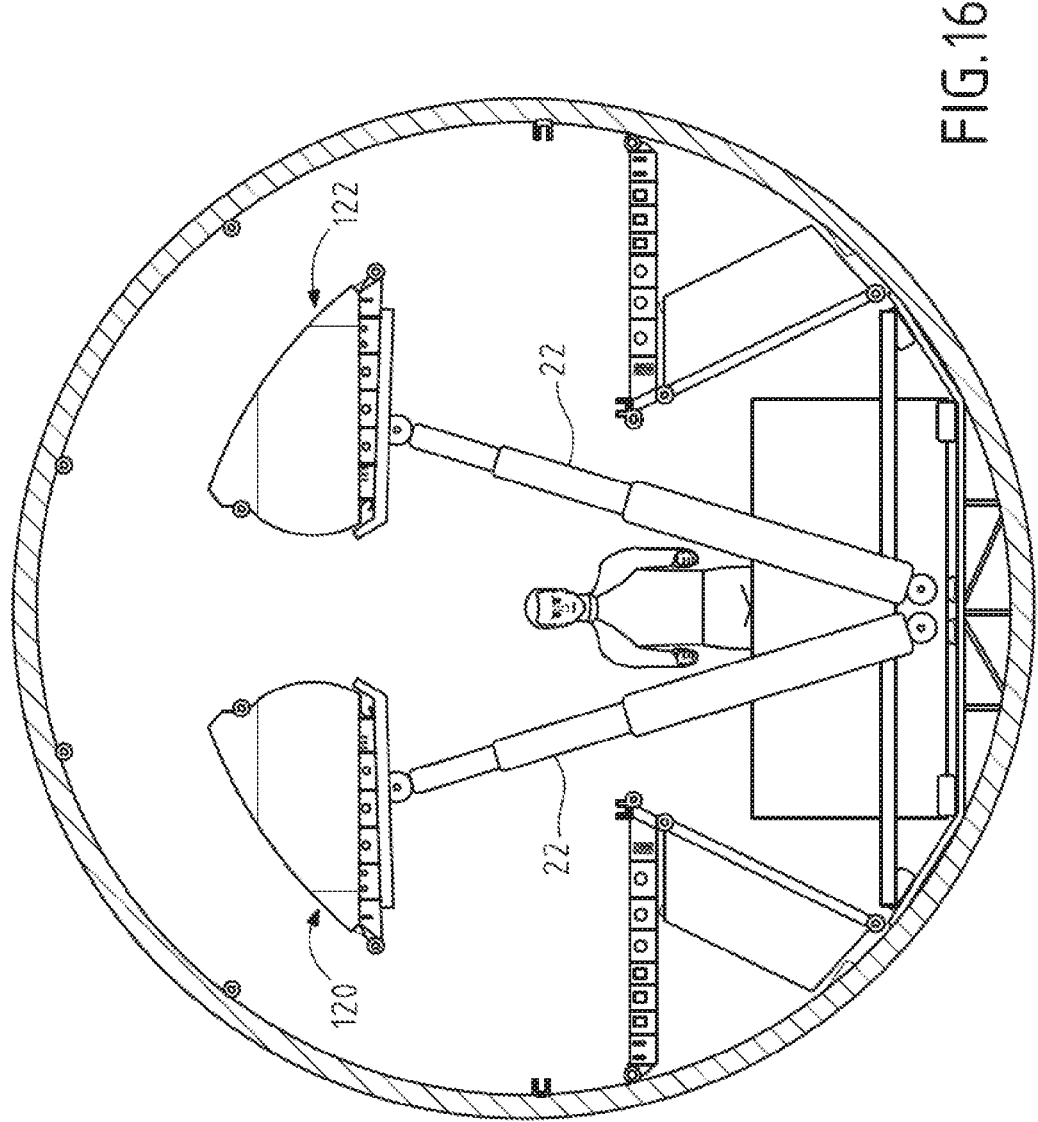

Each upper lateral stowage compartment module 120, 122 (right and left stowage compartment modules) is supported by the elements 26 situated at the end of the telescopic arms 22 of the carriages such as the carriage 12 of FIG. 15.

All of the pairs of transmitters and receivers and the targets described in relation to FIG. 1b are used here to drive and automatically accompany the positioning of the two storage modules 120, 122 (step S13). The targets have been installed (in the step S1 or previously) at predetermined points of the fuselage which are not necessarily situated at the locations of the fixing elements but at a known distance therefrom.

Figure 17:
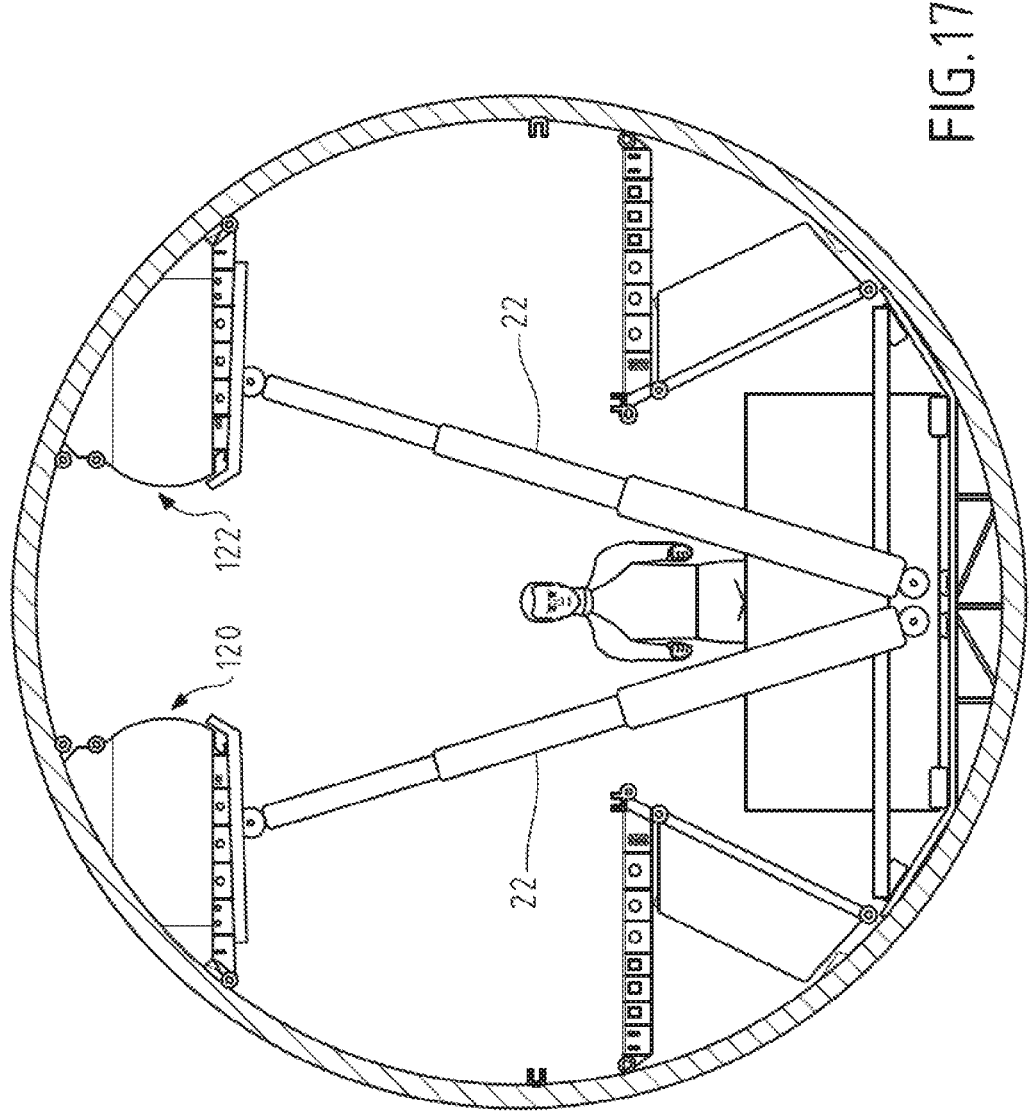
Figure 18:
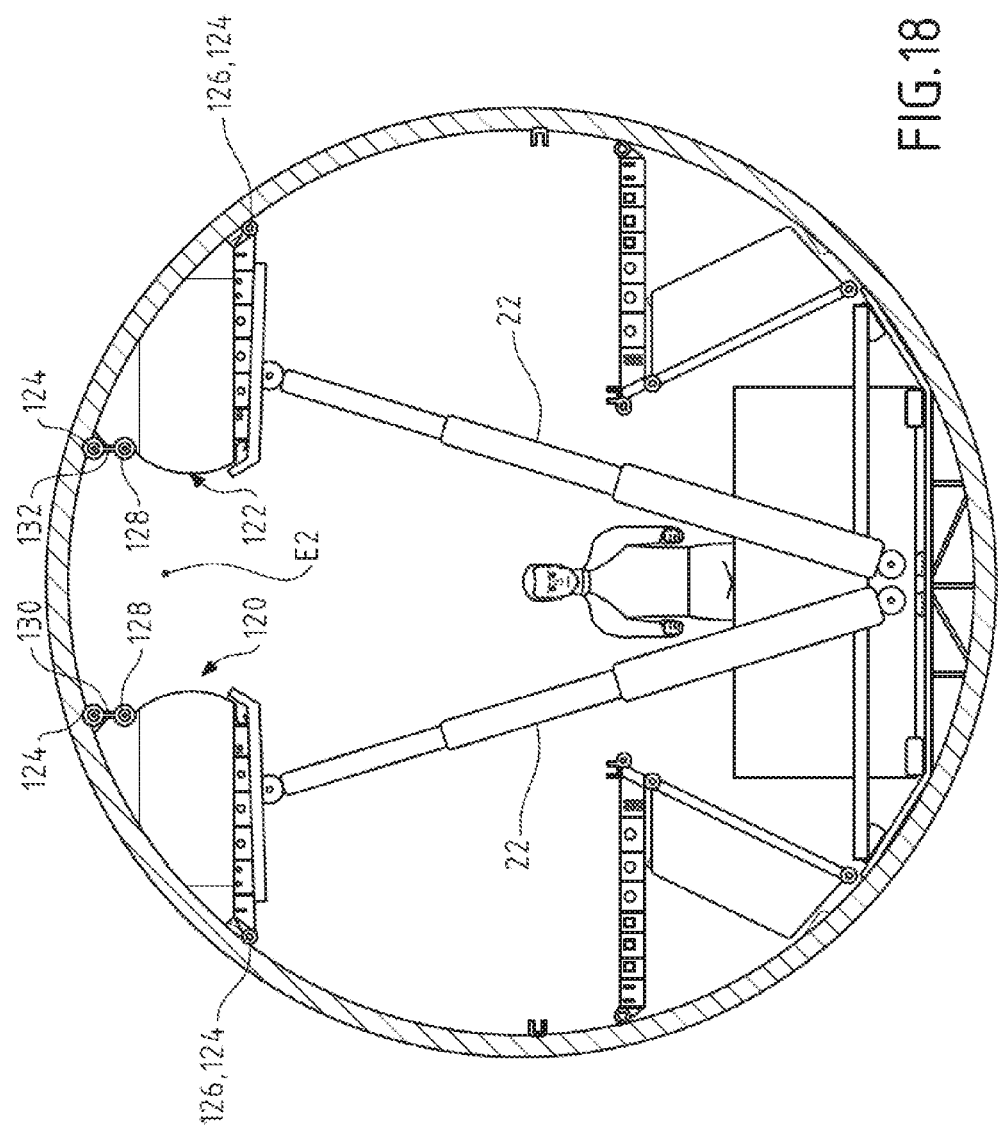

As represented in FIGS. 15 to 18, the carriages 12, programmed appropriately, automatically and symmetrically direct and deploy their telescopic arms 22 which move apart towards the outside of the carriages (FIG. 16) until they reach their maximum extension (FIGS. 17 and 18). This movement is made possible by virtue of the guidance provided by the signals supplied by all the pairs of transmitters and receivers cooperating with the associated targets (not represented in the figures).

The step S13 of the method corresponds to the simultaneous automatic positioning of the right stowage module 120 and of the left stowage module 122 respectively on two opposite upper lateral edges of the fuselage facing each other B3, B4. The edges B3, B4 are equipped with fixing elements 124 which will cooperate with respective complementary fixing elements 126, 128 of the stowage modules 120, 122 (e.g.: clevises and tenons). The operation of attachment of the fixing elements to one another is, for example, performed manually. Upper link rods 130, 132 link together the attachment elements 124 and 128 of the two modules 120, 122 (FIG. 18). An isostatic mounting (in the plane of the cross section) is thus produced and takes into account the deformations of the fuselage induced by the pressurization thereof, and the mechanical loads during flight.

The automatic positioning of each of the first and second pluralities of upper lateral stowage compartments 120, 122 respectively above the two lateral floor portions 80, 82, leaves an upper central space E2 free between the two pluralities of compartments. The compartments are thus arranged along the longitudinal axis of the central fuselage part, one behind the other.

Figure 19:
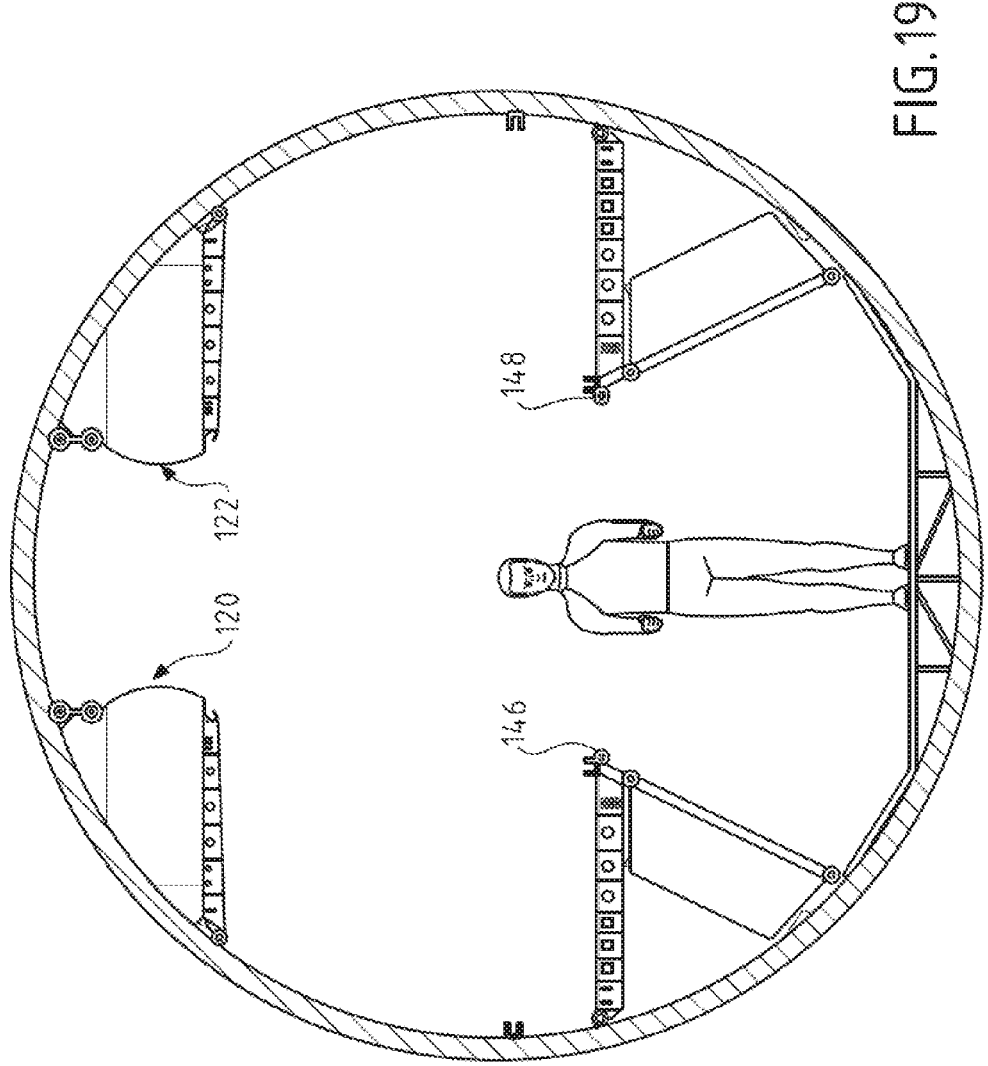

The telescopic arms 22 are retracted and the tooling train is removed from the aircraft (step S14) to obtain the configuration of FIG. 19.

A fourth type of aircraft equipment item to be integrated in the central part of the fuselage comprises a central floor portion 140.

Figure 20:
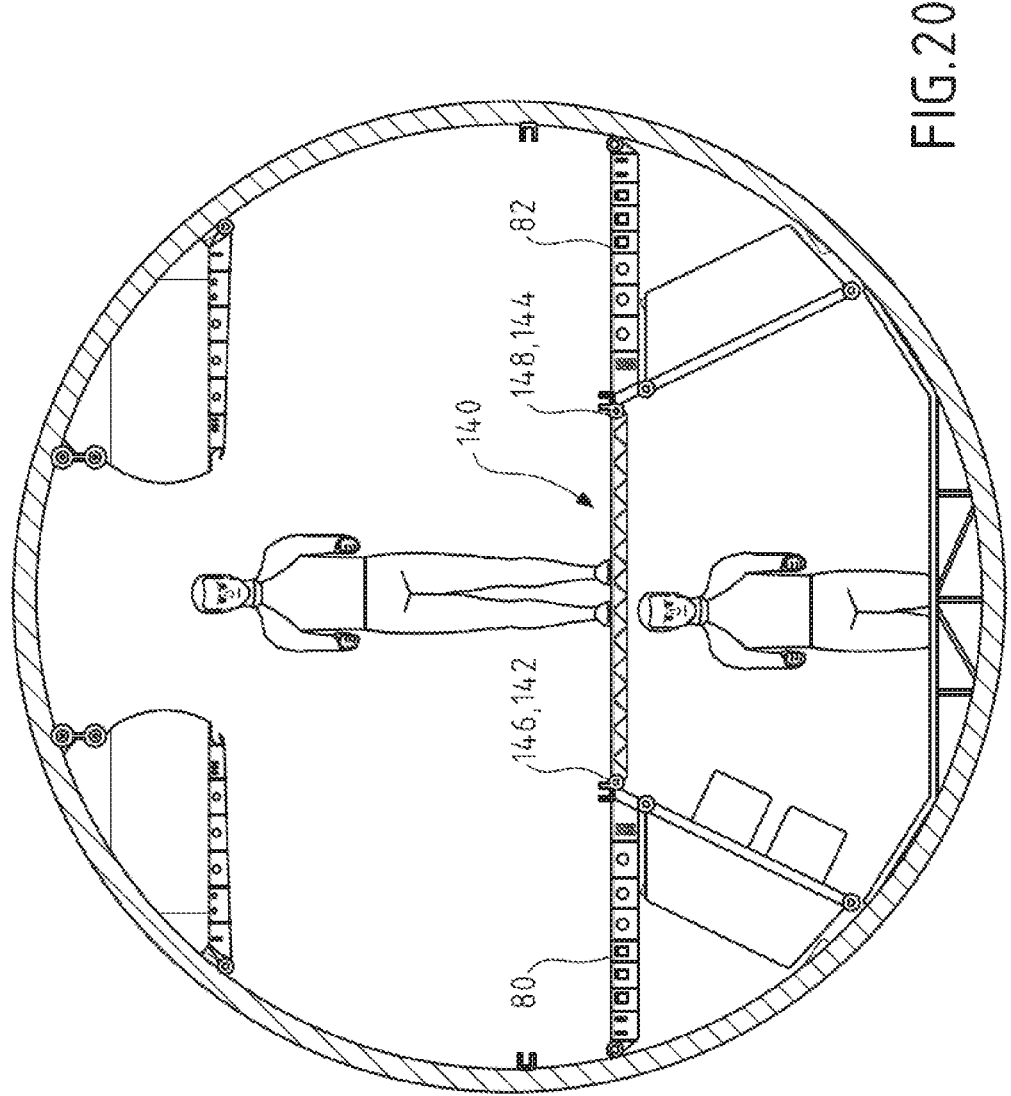
FIG. 20 illustrates the fitting of a central floor portion between the two lateral floor portions.

The central floor portion 140 to be integrated comprises a number of longitudinal floor segments which are positioned separately from one another along the longitudinal axis of the central fuselage part (step S15). Each segment comprises, at its two opposite lateral ends (in the plane of FIGS. 19 and 20), fixing elements 142, 144, which are engaged with complementary fixing elements 146, 148 with which the respective free ends of the two lateral floor portions 80, 82 are equipped (FIGS. 19 and 20). The fixing of an end of the central floor portion segment 140 to a free end of a lateral floor portion 80, 82 makes it possible to produce a link allowing a possible transverse movement between the two duly linked portions. This arrangement is useful in the deformation under pressure of the fuselage with circular cross section. The mounting of the floor segments is performed by hand by two people or by using simple tools. The floor segments, once fitted, form a continuous central floor portion. The dividing up of the central floor simplifies the fitting thereof and also makes it possible for operators to work more easily by removing a segment at the point where an intervention is needed. The operators can thus remain standing, which improves their working conditions. Moreover, the central floor segments can integrate, in their thickness, in longitudinal channels, all or some of the ventilation of the space situated under the floor and/or ensure the circulation of an extinguishing gas in case of fire in the zone concerned.

As illustrated in FIG. 21, sets of passenger seats which are designed in rows of several seats, for example, three seats each 156, 158, are mounted on the lateral floor portions 80, 82 (step S18).

The seats are each mounted on a large diameter horizontal tube 160 and the tube is mounted on a foot 162 common to the three seats and which is fixed to a fixing element 164, 166 of a free end of a lateral floor portion 80, 82.

The cross section of the central part of the fuselage of the aircraft is thus equipped as illustrated in FIG. 21.

The tooling assembly of FIG. 1a (with or without the set of transmitters/receivers and targets of FIG. 1b) makes it possible to quickly, simply and automatically fit elongate single-piece modules (e.g.: lateral floor modules and upper stowage modules), the length of each of which is, for example, substantially that of the central fuselage part.

Integration time for the central fuselage part is therefore considerably reduced compared to a conventional context in which a multitude of operations are necessary to fit a plurality of distinct equipment items using conventional tools.

The design of the tooling train and of the carriages of which it is composed is adapted to the single-piece modules and notably to their weight and their flexibility.

It will be noted that the components illustrated in FIG. 1b (transmitter/receiver pairs on the carriages and targets on the aircraft) and which help in the positioning of the carriages in the central fuselage part (spatial environment) can be arranged differently on the carriages and the aircraft. There can be different numbers thereof and they can be of a different type from that described.

Figure 2D:
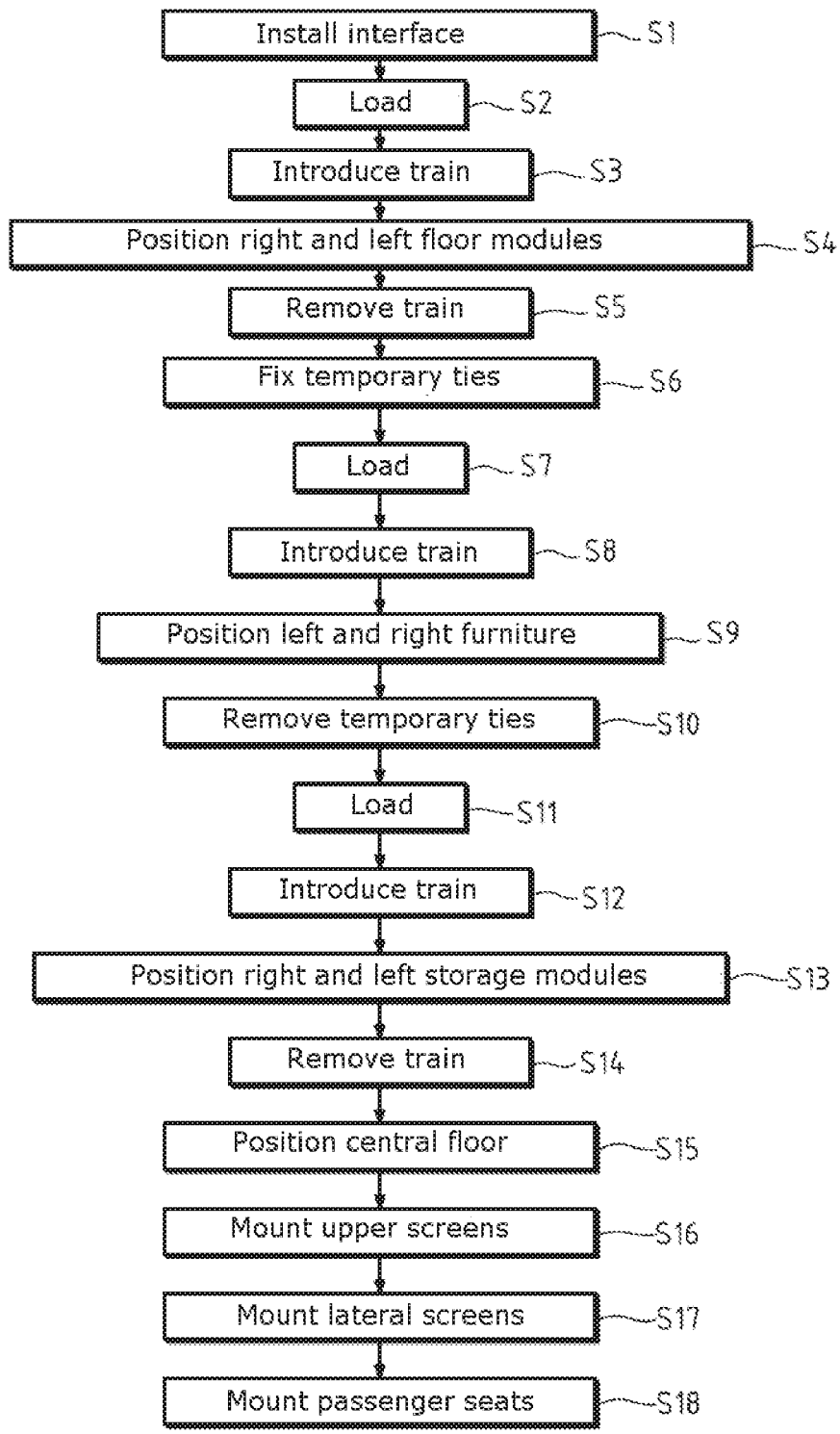
FIG. 2d is a schematic view of a flow diagram illustrating different steps of an integration method according to an embodiment of the invention.

A method for integrating aircraft equipment items using a tooling train has been described in relation to FIG. 2d and FIG. 3 and the following figures for equipment items which are not all in the form of elongate modules. However, a method for integrating aircraft equipment items using a tooling train composed of movable carriages linked together or not and suitable for carrying, each or jointly, one or more equipment items, can be used, more generally, only for single-piece elongate modules (modules each made of a single block and each having a length which is at least equal to the greatest transverse dimension of the central part of the fuselage, and, for example, substantially equal to the length of the central part of the fuselage). Such elongate modules are, for example, the left and right upper lateral floor portions 80, 82 and the left and right upper stowage compartments 120, 122. In this more general use, the flow diagram of FIG. 2d is simplified accordingly.

According to a variant not represented, the set of carriages forming the tooling train used for the integration of aircraft equipment item(s) has a length less than that of the central fuselage part requiring integration.

According to a variant not represented, one or several elongate modules have a length less than that of the tooling train.

According to a variant not represented, one or several elongate modules have a length less than that of the central fuselage part requiring integration.

According to a variant not represented, the positioning of a number of elongate modules, for example, of a right module and of a left module, in the central fuselage part, can be performed simultaneously or not, by using at least some of the carriages of the tooling train, even all the carriages.

According to a variant not represented, the carriages of the tooling train are not linked/connected mechanically to one another but physically independent of one another. Their movements are coordinated relative to one another by their own piloting system.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A tooling assembly for integrating a central part of the fuselage of an aircraft comprising:
   a tooling train comprising:
      a succession of movable carriages arranged behind one another, aligned along a longitudinal axis corresponding to a direction of movement of the tooling train, and
      each movable carriage is configured to carry one or more items of aircraft equipment to be integrated into a central part of an aircraft
      wherein each movable carriage is equipped with a unit for supporting one or more aircraft equipment items and for positioning said one or more aircraft equipment items at a predetermined location in the central part of the fuselage in order for the one or more aircraft equipment items to be integrated,
      wherein each movable carriage is autonomous and has an energy source and a piloting system enabling each movable carriage to be moved, to be positioned relative to the other carriages and to maneuver the unit for supporting and positioning the one or more aircraft equipment items automatically and in synchronism with the other carriages in the succession of movable carriages.

2. The tooling assembly according to claim 1, wherein the unit for supporting and positioning the one or more aircraft equipment items comprises telescopic arms each provided at their free end with an element comprising a reception surface for the aircraft equipment item or the part of equipment item concerned.

3. The tooling assembly according to claim 1, further comprising:
   a set of electromagnetic signal transmitters/receivers carried by the carriages of the tooling train, and
   a set of targets intended to be fixed to the central part of the fuselage of an aircraft, which are each targeted by the electromagnetic signal emitted and which reflect it to a receiver, said sets of transmitters/receivers and of targets being configured for positioning each carriage relative to its spatial environment.

4. The tooling assembly according to claim 1, wherein the number of carriages and the dimensioning of the units for supporting and positioning the one or more aircraft equipment items depends on the aircraft equipment items to be supported and to be positioned in the central part of the fuselage and notably on their weight and on their flexibility.

5. The tooling assembly according to claim 1, wherein the tooling train is configured to operate in a programmed manner in carrying out predetermined operations.

6. The tooling assembly according to claim 1, wherein the carriages are suitable for rolling on a track.

7. A method for integrating at least one aircraft equipment item in a central part of the fuselage of an aircraft, comprising the steps:
   providing a tooling train comprising:
      a succession of movable carriages arranged behind one another, aligned along a longitudinal axis corresponding to a direction of movement of the tooling train, and
      the movable carriages being configured to carry one or more items of aircraft equipment to be integrated into the central part of the aircraft, and
   integrating the one or more items of aircraft equipment in the central part of the fuselage with the tooling train,
   wherein each movable carriage in the succession of movable carriages is autonomous and has an energy source and a piloting system enabling each movable carriage to be moved, to be positioned relative to the other carriages and to maneuver the one or more aircraft equipment items automatically and in synchronism with the other carriages in the succession of movable carriages.

8. The method according to claim 7, wherein the central part of the fuselage has a cross section with constant geometry.

9. The method according to claim 7, wherein the central part of the fuselage comprises two opposite ends of which at least one end is open, the method comprises introducing the tooling train into the central part through the open end, to a working position, the tooling train carrying at least one aircraft equipment item to be integrated in the central part.

10. The method according to claim 9, further comprising automatically positioning said at least one aircraft equipment item at a predetermined location in the central part of the fuselage by the tooling train.

11. The method according to claim 7, further comprising the step of placing an interface at a bottom of the central part of the fuselage of an interface prior to introducing the tooling train into the fuselage, which interface is suitable for supporting a movement of the carriages of the tooling train and a parking thereof in a working position in the central part.

12. The method according to claim 7, wherein the tooling train has a length corresponding substantially to a length of the central part of the fuselage.

13. The method according to claim 7, wherein at least some of the carriages of which the tooling train is composed carry at least one aircraft equipment item to be integrated in the central part of the fuselage, said at least one equipment item having the form of an elongate module, the length of which corresponds to at least the greatest transverse dimension of the central part of the fuselage and which is to be integrated parallel to the longitudinal axis of the aircraft.

14. The method according to claim 13, wherein said at least one aircraft equipment item to be integrated in the central part of the fuselage comprises two lateral floor portions each forming an elongate single-piece module, the two lateral floor portions being conveyed by the train and positioned respectively at two opposite lateral edges of the fuselage facing each other, automatically, thus leaving a central corridor free between the two duly positioned lateral floor portions.

15. The method according to claim 14, wherein said at least one aircraft equipment item to be integrated in the central part of the fuselage comprises a first and a second plurality of upper lateral stowage compartments each forming an elongate single-piece module, the first and second pluralities of upper lateral stowage compartments being conveyed by the train and positioned respectively at two opposite lateral edges of the fuselage facing each other, automatically, thus leaving an upper central space free between the two pluralities of compartments.

16. An aircraft comprising a central fuselage part that is elongate along a longitudinal axis, comprising at least one aircraft equipment item which is integrated in the central fuselage part according to the method in accordance with claim 7.

17. The aircraft according to claim 16, wherein said at least one aircraft equipment item has the form of an elongate module arranged parallel to the longitudinal axis, the elongate module having a length which is at least equal to the greatest transverse dimension of the central part of the fuselage.

18. The aircraft according to claim 17, wherein the elongate module has a length which is substantially equal to the length of the central part of the fuselage.

19. The aircraft according to claim 16, wherein the central fuselage part has a cross section with constant geometry.

20. The aircraft according to claim 16, wherein said at least one aircraft equipment item comprises two lateral floor portions, each forming an elongate single-piece module, the two lateral floor portions being arranged respectively at two opposite lateral edges of the fuselage facing each other, thus leaving a central corridor free between the two lateral floor portions.

21. The aircraft according to claim 16, wherein said at least one aircraft equipment item comprises a first and a second plurality of upper lateral stowage compartments each forming an elongate single-piece module, the first and second pluralities of upper lateral stowage compartments being arranged respectively at two opposite lateral edges of the fuselage facing each other, thus leaving an upper central space free between the two pluralities of compartments.

22. A tooling assembly for integrating a central part of the fuselage of an aircraft comprising:
 a tooling train comprising:
  a succession of movable carriages arranged behind one another, aligned along a longitudinal axis corresponding to a direction of movement of the tooling train, and
  each movable carriage is configured to carry one or more items of aircraft equipment to be integrated into a central part of an aircraft,
  wherein each movable carriage is autonomous and has an energy source and a piloting system enabling each movable carriage to be moved, to be positioned relative to the other carriages and to maneuver the one or more aircraft equipment items automatically and in synchronism with the other carriages in the succession of movable carriages.

23. The tooling assembly according to claim 1, wherein the carriages are linked to one another.

24. The tooling assembly according to claim 1, wherein each carriage is configured to support only a part of a module and is configured to position only that part of the module inside the aircraft in synchronism with the other carriages.

25. The tooling assembly according to claim 22, wherein the carriages are linked to one another.

26. The tooling assembly according to claim 22, wherein each carriage is configured to support only a part of a module and is configured to position only that part of the module inside the aircraft in synchronism with the other carriages.

27. The method according to claim 7, wherein each carriage is configured to support only a part of a module and is configured to position only that part of the module inside the aircraft in synchronism with the other carriages.

* * * * *